United States Patent
Kletti et al.

(10) Patent No.: US 12,216,667 B2
(45) Date of Patent: Feb. 4, 2025

(54) RANKING SYSTEMS AND METHODS USING A DYNAMIC BAYESIAN NETWORK EXPOSURE MODEL

(71) Applicant: Naver Corporation, Gyeonggi-do (KR)

(72) Inventors: Till Kletti, La Tronche (FR); Jean-Michel Renders, Quaix en Chartreuse (FR)

(73) Assignee: NAVER CORPORATION, Gyeonggi-Do (KR)

( * ) Notice: Subject to any disclaimer, the term of this patent is extended or adjusted under 35 U.S.C. 154(b) by 203 days.

(21) Appl. No.: 18/084,239

(22) Filed: Dec. 19, 2022

(65) Prior Publication Data

US 2023/0185815 A1 Jun. 15, 2023

Related U.S. Application Data

(63) Continuation-in-part of application No. 17/655,049, filed on Mar. 16, 2022, now abandoned.

(30) Foreign Application Priority Data

May 6, 2021 (FR) .................................. 2104801
Nov. 8, 2021 (EP) .................................. 21306565
May 5, 2022 (FR) .................................. 2204288

(51) Int. Cl.
G06F 16/2457 (2019.01)
(52) U.S. Cl.
CPC .............................. G06F 16/24578 (2019.01)
(58) Field of Classification Search
None
See application file for complete search history.

(56) References Cited

U.S. PATENT DOCUMENTS

2004/0073538 A1   4/2004 Leishman et al.
2018/0046967 A1*  2/2018 Ghosh .............. G06Q 10/06393

OTHER PUBLICATIONS

Low-discrepancy sequence, Dec. 2020. Page Version ID: 993584035, retrieved on Internet at https://en.wikipedia.org/w/index.php?title=Lowdiscrepancy_sequence&oldid=993584035.
Demofox2. Weighted Round Robin (Weighted Random Integers) Using The Golden Ratio Low Discrepancy Sequence, Jun. 2020 retrieved from internet at https://blog.demofox.org/2020/06/23/weighted-round-robin-using-the-golden-ratio-low-discrepancy-sequence/2021.

(Continued)

*Primary Examiner* — Kannan Shanmugasundaram

(57) ABSTRACT

A method for ranking a set of objects includes: receiving the set of objects to rank, a relevance score for each object, and a set of objective functions; based on the relevance scores for the objects, defining a decision space having n decision variables using a polytope, where n is the number of objects to rank and where vertices of the polytope represent permutations of exposures provided to the objects in the set by corresponding rankings; determining a Pareto-set for the set of objective functions; based on a Pareto-optimal point in the Pareto-set, determining a distribution over rankings for the objects in the set using the decision space, where a proportion is associated with each ranking in the distribution; selecting a sequence of rankings for the objects in the set based on the distribution in accordance with their proportions; and outputting the selected sequence of rankings of the objects.

33 Claims, 26 Drawing Sheets

(56) References Cited

OTHER PUBLICATIONS

Agarwal, Alekh, Miroslav Dudik, and Zhiwei Steven Wu. 'Fair Regression: Quantitative Definitions and Reduction-Based Algorithms'. Published on arXiv as 190512843, May 29, 2019. http://arxiv.org/abs/1905.12843.
Biega Asia J., Fernando Diaz, Michael D. Ekstrand, and Sebastian Kohlmeier. 2020. Overview of the TREC 2020 Fair Ranking Track. In The Twenty-Eighth Text REtrieval Conference (TREC 2020) Proceedings https://arxiv.org/pdf/2108.05135.pdf.
Biega, Asia J., Krishna P. Gummadi, and Gerhard Weikum. 'Equity of Attention: Amortizing Individual Fairness in Rankings'. The 41st International ACM SIGIR Conference on Research & Development in Information Retrieval 405-14, Jun. 27, 2018 https://doi.org/10.1145/3209978.3210063.
Caratheodory, C. in Giittingen. 'Uber den Variabilitatsbereich der Koeffizienten yon Potenzreihen, die gegebene Werte nichT annehmen. ', 1907 https://doi.org/10.1007/BF01449883.
Caton Simon and Haas Christian. Fairness in machine learning: A survey, 2020. Published on arXiv as 202104053, Oct. 4, 2020 https://arxiv.org/pdf/2010.04053.pdf.
Chapelle, Olivier, Donald Metlzer, Ya Zhang, and Pierre Grinspan. 'Expected Reciprocal Rank for Graded Relevance'. In Proceeding of the 18th ACM Conference on Information and Knowledge Management—CIKM '09, 621. Hong Kong, China: ACM Press, 2009. https://doi.org/10.1145/1645953.1646033.
Chapelle, Olivier, and Ya Zhang. 'A Dynamic Bayesian Network Click Model for Web Search Ranking'. In Proceedings of the 18th International Conference on World Wide Web—WWW '09, 1. Madrid, Spain: ACM Press, 2009. https://doi.org/10.1145/1526709.1526711.
Chuklin, Aleksandr, Ilya Markov, and Maarten de Rijke. 'Click Models for Web Search'. Synthesis Lectures on Information Concepts, Retrieval, and Services 7, No. 3 (Jul. 15, 2015): 1-115. 2015 https://doi.org/10.2200/S00654ED1V01Y201507ICR043.
Diaz, Fernando, Bhaskar Mitra, Michael D. Ekstrand, Asia J. Biega, and Ben Carterette. 'Evaluating Stochastic Rankings with Expected Exposure'. In Proceedings of the 29th ACM International Conference on Information & Knowledge Management, 275-84. Virtual Event Ireland: ACM, 2020. https://doi.org/10.1145/3340531.3411962.
Do, Virginie, Sam Corbett-Davies, Jamal Atif, and Nicolas Usunier. 'Online Certification of Preference-Based Fairness for Personalized Recommender Systems'. Published on arXiv as 210414527, Apr. 2021. http://arxiv.org/abs/2104.14527.
Dufossé, Fanny, Kamer Kaya, Ioannis Panagiotas, and Bora Uçar. 'Further Notes on Birkhoff-von Neumann Decomposition of Doubly Stochastic Matrices'. Linear Algebra and Its Applications 554: 68-78. Oct. 2018 https://doi.org/10.1016/j.laa.2018.05.017.
Dufossé, Fanny, and Bora Uçar. 'Notes on Birkhoff-von Neumann Decomposition of Doubly Stochastic Matrices'. Linear Algebra and Its Applications 497 (May 2016): 108-15. 2016 https://doi.org/10.1016/j.laa.2016.02.023.
Duncan Luce R.. Individual Choice Behavior: A Theoretical Analysis. Dover Publications, Chapitre 2.F. Rank Orderings. Mineola, N.Y, Jan. 2005.
Dwork, Cynthia, Moritz Hardt, Toniann Pitassi, Omer Reingold, and Richard Zemel. 'Fairness through Awareness'. In Proceedings of the 3rd Innovations in Theoretical Computer Science Conference on—ITCS '12, 214-26. Cambridge, Massachusetts: ACM Press, 2012. https://doi.org/10.1145/2090236.2090255.
Geyik, Sahin Cem, Stuart Ambler, and Krishnaram Kenthapadi. 'Fairness-Aware Ranking in Search & Recommendation Systems with Application to LinkedIn Talent Search'. In Proceedings of the 25th ACM SIGKDD International Conference on Knowledge Discovery & Data Mining, 2221-31. Anchorage AK USA: ACM, 2019. https://doi.org/10.1145/3292500.3330691.
Grotschel, Martin Laszlo Lovasz, and Alexander Schrijver. Geometric Algorithms and Combinatorial Optimization. Reference to Theorem 6.5.11 and its proof in chapter 6: Rational Polyhedra. Springer Science & Business Media, Dec. 2012. https://link.springer.com/content/pdf/bfm:978-3-642-97881-4/1?pdf=chapter%20toc.
Hoeksma, Ruben, Bodo Manthey, and Marc Uetz. 'Efficient Implementation of Carathéodory's Theorem for the Single Machine Scheduling Polytope'. Discrete Applied Mathematics 215 (Dec. 2016): 136-45. 2016 https://doi.org/10.1016/j.dam.2016.06.031.
Järvelin, Kalervo, and Jaana Kekäläinen. 'Cumulated Gain-Based Evaluation of IR Techniques'. ACM Transactions on Information Systems 20, No. 4 (Oct. 2002): 422-46. 2022 https://doi.org/10.1145/582415.582418.
Kletti, Till, and Jean-Michel Renders. 'Naver Labs Europe at TREC 2020 Fair Ranking Track', p. 4, 2020.
Kletti, Till, Jean-Michel Renders, and Patrick Loiseau. 'Introducing the Expohedron for Efficient Pareto-Optimal Fairness-Utility Amortizations in Repeated Rankings'. In Proceedings of the Fifteenth ACM International Conference on Web Search and Data Mining, 498-507. Virtual Event AZ USA: ACM, 2022. https://doi.org/10.1145/3488560.3498490.
Kletti, Till. 'Introducing the Expohedron for Efficient Pareto-Optimal Fairness-Utility Amortizations in Repeated Rankings'. In Proceedings of the Fifteenth ACM International Conference on Web Search and Data Mining, 498-507. Virtual Event AZ USA: ACM, 2022. https://doi.org/10.1145/3488560.3498490.
Kobus, Catherine, Josep Crego, and Jean Senellart. 'Domain Control for Neural Machine Translation'. arXiv, Sep. 12, 2017. http://arxiv.org/abs/1612.06140.
Marcus M.and R. Ree. 1959. Diagonals of doubly stochastic matrices. The Quarterly Journal of Mathematics 10, 1 (Jan. 1959), 296-302. 1959.
Marshall, Albert W., Ingram Olkin, and Barry C. Arnold. Inequalities: Theory of Majorization and Its Applications. Chapter 1: Introduction Springer Series in Statistics. New York, NY: Springer New York, 2011. https://doi.org/10.1007/978-0-387-68276-1.
Moffat, Alistair, and Justin Zobel. 'Rank-Biased Precision for Measurement of Retrieval Effectiveness'. ACM Transactions on Information Systems 27, No. 1 (Dec. 2008): 1-27. 2008 https://doi.org/10.1145/1416950.1416952.
Morik, Marco, Ashudeep Singh, Jessica Hong, and Thorsten Joachims. 'Controlling Fairness and Bias in Dynamic Learning-to-Rank'. Proceedings of the 43rd International ACM SIGIR Conference on Research and Development in Information Retrieval, 429-38. Jul. 25, 2020 https://doi.org/10.1145/3397271.3401100.
Narasimhan, Harikrishna, Andrew Cotter, Maya Gupta, and Serena Wang. 'Pairwise Fairness for Ranking and Regression'. Proceedings of the AAAI Conference on Artificial Intelligence 34, No. 04 (Apr. 3, 2020): 5248-55. 2020 https://doi.org/10.1609/aaai.v34i04.5970.
Naszódi Márton and Alexandr Polyanskii. 2019. Perron and Frobenius meet Carathéodory. Published on arXiv as 1901.00540, Jan. 2019 https://arxiv.org/pdf/1901.00540.pdf.
Onn, Shmuel. 'Geometry, Complexity, and Combinatorics of Permutation Polytopes'. Journal of Combinatorial Theory, Series A 64, No. 1 (Sep. 1993): 31-49. 1993 https://doi.org/10.1016/0097-3165(93)90086-N.
Oosterhuis, Harrie. 'Computationally Efficient Optimization of Plackett-Luce Ranking Models for Relevance and Fairness'. In Proceedings of the 44th International ACM SIGIR Conference on Research and Development in Information Retrieval, 1023-32. Virtual Event Canada: ACM, 2021. https://doi.org/10.1145/3404835.3462830.
Ping, Wei, Kainan Peng, Andrew Gibiansky, Sercan O. Arik, Ajay Kannan, Sharan Narang, Jonathan Raiman, and John Miller. 'Deep Voice 3: Scaling Text-to-Speech with Convolutional Sequence Learning'. arXiv, Feb. 22, 2018. http://arxiv.org/abs/1710.07654.
Pitoura, Evaggelia, Kostas Stefanidis, and Georgia Koutrika. 'Fairness in Rankings and Recommendations: An Overview'. The VLDB Journal 31, No. 3: 431-58. 2021 https://link.springer.com/content/pdf/10.1007/s00778-021-00697-y.pdf.
Plackett R. L. 1975. The Analysis of Permutations. Journal of the Royal Statistical Society. Series C (Applied Statistics) 24, 2 (1975), 193-202. 1975 https://doi.org/10.2307/2346567.
Qin, Tao, and Tie-Yan Liu. 'Introducing LETOR 4.0 Datasets', CoRR abs/1306.2597 (2013). Published on arxiv as 13062597, 2013. https://arxiv.org/ftp/arxiv/papers/1306/1306.2597.pdf.

(56) References Cited

OTHER PUBLICATIONS

Rado R. 1952. An Inequality. Journal of the London Mathematical Society s1-27, 1, 1-6.1952 https://londmathsoc.onlinelibrary.wiley.com/doi/epdf/10.1112/jlms/s1-27.1.1.

Roberts Martin, The unreasonable eectiveness of quasirandom sequences, Apr. 2018. blog post http://extremelearning.com.au/unreasonable-effectiveness-of-quasirandom-sequences/.

Robertson, S.E. 'The Probability Ranking Principle in IR'. Journal of Documentation 33, No. 4 : 294-304. Apr. 1, 1977 https://doi.org/10.1108/eb026647.

Salimi, Babak, Luke Rodriguez, Bill Howe, and Dan Suciu. 'Interventional Fairness: Causal Database Repair for Algorithmic Fairness'. In Proceedings of the 2019 International Conference on Management of Data, 793-810. Amsterdam Netherlands: ACM, 2019. https://doi.org/10.1145/3299869.3319901.

Sano, Shinya, Naoto Miyoshi, and Ryohei Kataoka. 'M-Balanced Words: A Generalization of Balanced Words'. Theoretical Computer Science 314, No. 1-2 (Feb. 2004): 97-120. 2004 https://doi.org/10.1016/j.tcs.2003.11.021.

Schretter, Colas, Leif Kobbelt, and Paul-Olivier Dehaye. 'Golden Ratio Sequences for Low-Discrepancy Sampling'. Journal of Graphics Tools 16, No. 2: 95-104. Jun. 2012 https://doi.org/10.1080/2165347X.2012.679555.

Singh Ashudeep and Thorsten Joachims. Fairness of Exposure in Rankings. In Proceedings of the 24th ACM SIGKDD International Conference on Knowledge Discovery & Data Mining—KDD '18, pp. 2219{2228, London, United Kingdom, 2018. https://doi.org/10.1145/3219819.3220088

Singh Ashudeep and Thorsten Joachims. Policy Learning for Fairness in Ranking. 33rd Conference NeurIPS 2019, Vancouver Canada, 2019 instead of In H. Wallach, H. Larochelle, A. Beygelzimer, F. dntextquotesingle Alch_e-Buc, E. Fox, and R. Garnett, editors, Advances in Neural Information Processing Systems 32, pp. 5427{5437. Curran Associates, Inc., 2019.

Singh, Ashudeep, David Kempe, and Thorsten Joachims. 'Fairness in Ranking under Uncertainty'. Published on arXiv as 10706720, Jul. 2021, https://arxiv.org/abs/2107.06720.

Su, Yi, Magd Bayoumi, and Thorsten Joachims. 'Optimizing Rankings for Recommendation in Matching Markets'. Published on arXiv as 210601941, Jun. 3, 2021. http://arxiv.org/abs/2106.01941.

Thonet, Thibaut, and Jean-Michel Renders. 'Multi-Grouping Robust Fair Ranking'. In Proceedings of the 43rd International ACM SIGIR Conference on Research and Development in Information Retrieval, 2077-80. Virtual Event China: ACM, 2020. https://doi.org/10.1145/3397271.3401292.

Trabucco Brandon. 2021. brandontrabucco/bvn. https://github.com/brandontrabucco/bvnoriginal-date: 2020-09-15T00:11:02Z.

Vuillon Laurent. Balanced words. Bulletin of the Belgian Mathematical Society—Simon Stevin 10, 5 (Dec. 2003), 787-805. 2003.

Waldspurger, Carl A, and William E Weihl. 'Stride Scheduling: Deterministic Proportional-Share Resource Management', Technical Report. Massachusetts Institute of Technology, USA. 1995.

Wang Lequn and Thorsten Joachims. Fairness and Diversity for Rankings in Two-Sided Markets. Published on arXiv as 201001470, Oct. 2020. https://arxiv.org/pdf/2010.01470v1.pdf.

Wang, Lequn, Yiwei Bai, Wen Sun, and Thorsten Joachims. 'Fairness of Exposure in Stochastic Bandits'. Published on arXiv as 210302735, Sep. 12, 2021. http://arxiv.org/abs/2103.02735.

Wang, Lequn, and Thorsten Joachims. 'User Fairness, Item Fairness, and Diversity for Rankings in Two-Sided Markets'. In Proceedings of the 2021 ACM SIGIR International Conference on Theory of Information Retrieval, 23-41, 2021. https://doi.org/10.1145/3471158.3472260.

Wang, Yuxuan, R. J. Skerry-Ryan, Daisy Stanton, Yonghui Wu, Ron J. Weiss, Navdeep Jaitly, Zongheng Yang, et al. 'Tacotron: Towards End-to-End Speech Synthesis'. arXiv, Apr. 6, 2017. http://arxiv.org/abs/1703.10135.

Wang, Yuxuan, Daisy Stanton, Yu Zhang, R. J. Skerry-Ryan, Eric Battenberg, Joel Shor, Ying Xiao, Fei Ren, Ye Jia, and Rif A. Saurous. 'Style Tokens: Unsupervised Style Modeling, Control and Transfer in End-to-End Speech Synthesis'. arXi, Mar. 23, 2018. http://arxiv.org/abs/1803.09017.

Williams Ronald J. Simple statistical gradient-following algorithms for connectionist reinforcement learning. Mach. Learn., 8:229{256, 1992.

Wu, Yao, Jian Cao, Guandong Xu, and Yudong Tan. 'TFROM: A Two-Sided Fairness-Aware Recommendation Model for Both Customers and Providers'. Published on arXiv as 210409024, Apr. 18, 2021. http://arxiv.org/abs/2104.09024.

Yadav Himank, Zhengxiao Du, and Thorsten Joachims. Fair Learning-to-Rank from Implicit Feedback. Published on arXiv as 191108054, Nov. 2019 https://arxiv.org/abs/1911.08054v1.

Yadav, Himank, Zhengxiao Du, and Thorsten Joachims. 'Policy-Gradient Training of Fair and Unbiased Ranking Functions'. In Proceedings of the 44th International ACM SIGIR Conference on Research and Development in Information Retrieval, 1044-53, 2021. https://doi.org/10.1145/3404835.3462953.

Yasutake, Shota, Kohei Hatano, Shuji Kijima, Eiji Takimoto, and Masayuki Takeda. 'Online Linear Optimization over Permutations'. In Algorithms and Computation, edited by Takao Asano, Shin-ichi Nakano, Yoshio Okamoto, and Osamu Watanabe, 7074:534-43. Lecture Notes in Computer Science. Berlin, Heidelberg: Springer Berlin Heidelberg, 2011. https://doi.org/10.1007/978-3-642-25591-5_55.

Zehlike, Meike, Francesco Bonchi, Carlos Castillo, Sara Hajian, Mohamed Megahed, and Ricardo Baeza-Yates. 'FA*IR: A Fair Top-k Ranking Algorithm'. In Proceedings of the 2017 ACM on Conference on Information and Knowledge Management, 1569-78. Singapore Singapore: ACM, 2017. https://doi.org/10.1145/3132847.3132938.

Zehlike Meike, Ke Yang, and Julia Stoyanovich. 2021. Fairness in Ranking: A Survey. Published on arXiv as 210314000, May 2021. http://arxiv.org/abs/2103.14000.

Zehlike Meike and Carlos Castillo. 2020. Reducing Disparate Exposure in Ranking: A Learning to Rank Approach. In Proceedings of The Web Conference 2020 (WWW '20). 2849-2855.2020 https://dl.acm.org/doi/10.1145/3366424.3380048.

European Search report for European Patent Application No. 21306565.9 dated Mar. 21, 2022.

Cvxopt/cvxopt. Retrieved on internet at https://github.com/cvxopt/cvxopt original-date: 2013-02-22T22:14:31Z.

Alekh Agarwal, Miroslav Dudik, and Zhiwei Steven Wu. 2019. Fair Regression: Quantitative Definitions and Reduction-based Algorithms. arXiv: 1905.12843 [cs, stat] (May 2019). http://arxiv.org/abs/1905.12843 arXiv: 1905.12843.

Asia J. Biega, Fernando Diaz, Michael D. Ekstrand, and Sebastian Kohlmeier. 2019. Overview of the TREC 2019 Fair Ranking Track. In The Twenty-Eighth Text REtrieval Conference (TREC 2019) Proceedings.

Biega, Asia J., Krishna P. Gummadi, and Gerhard Weikum. "Equity of Attention: Amortizing Individual Fairness in Rankings." ArXiv 2018.

Chapelle, Olivier, Donald Metlzer, Ya Zhang, and Pierre Grinspan. "Expected Reciprocal Rank for Graded Relevance." In *Proceeding of the 18th ACM Conference on Information and Knowledge Management—CIKM '09*, 621. Hong Kong, China: ACM Press, 2009.

Chapelle, Olivier, and Ya Zhang. "A Dynamic Bayesian Network Click Model for Web Search Ranking." In *Proceedings of the 18th International Conference on World Wide Web—WWW '09*, 1. Madrid, Spain: ACM Press, 2009.

Chuklin, Aleksandr, Ilya Markov, and Maarten de Rijke. "Click Models for Web Search." *Synthesis Lectures on Information Concepts, Retrieval, and Services* 7, No. 3, 2015.

Diaz, Fernando, Bhaskar Mitra, Michael D. Ekstrand, Asia J. Biega, and Ben Carterette. "Evaluating Stochastic Rankings with Expected Exposure." In *Proceedings of the 29th ACM International Conference on Information & Knowledge Management*, 275-84. Virtual Event Ireland: ACM, 2020.

Cynthia Dwork, Moritz Hardt, Toniann Pitassi, Omer Reingold, and Richard Zemel. 2011. Fairness through awareness. In Proceedings of the 3rd Innovations in Theoretical Computer Science Conference

(56) References Cited

OTHER PUBLICATIONS on—ITCS '12. ACM Press, Cambridge, Massachusetts, 214-226. https://doi.org/10.1145/2090236.2090255.

Hong, Yili. "On Computing the Distribution Function for the Poisson Binomial Distribution." *Computational Statistics & Data Analysis*, 2013.

Morik, Marco, Ashudeep Singh, Jessica Hong, and Thorsten Joachims. "Controlling Fairness and Bias in Dynamic Learning-to-Rank." arXiv, 2020.

Mitra, Bhaskar, Nalisnick Eric, Craswell Nick, Caruana Rich. "A Dual Embedding Space Model for Document Ranking.Pdf," arXiv, 2016.

Naszódi, Márton, and Alexandr Polyanskii. "Perron and Frobenius Meet Carathéodory." arXiv 2019.

Niculescu-Mizil, Alexandru, and Rich Caruana. "Predicting Good Probabilities with Supervised Learning." In *Proceedings of the 22nd International Conference on Machine Learning*. Bonn, Germany: ACM Press, 2005.

Evaggelia Pitoura, Kostas Stefanidis, and Georgia Koutrika. 2021. Fairness in Rankings and Recommendations: An Overview. arXiv:2104.05994 [cs] (Apr. 2021). http://arxiv.org/abs/2104.05994 arXiv: 2104.05994.

Stephen Robertson. 1977. *The Probability Ranking Principle in IR*. Journal of Documentation 33 (Dec. 1977), 294-304. https://doi.org/10.1108/eb026647.

Walter Rudin. 1987. Real and complex analysis (3rd ed ed.). McGraw-Hill, New York.

Schretter, Colas, Leif Kobbelt, and Paul-Olivier Dehaye. "Golden Ratio Sequences for Low-Discrepancy Sampling." *Journal of Graphics Tools*, 2012.

Singh Ashudeep and Joachims Thorsten. "Fairness of Exposure in Rankings" In *Proceedings of the 24th ACM SIGKDD International Conference on Knowledge Discovery & Data Mining—KDD '18. ACM Press*, 2018.

Singh Ashudeep and Joachims Thorsten. "Policy Learning for Fairnes in Ranking". *In Advances in Neural Information Processing Systems*, 2019.

Jones, K Sparck, S Walker, and S E Robertson. "A Probabilistic Model of Information Retrieval?: Development and Comparative Experiments: Part 1," Information Processing & Management, 2000.

Tsakim. 2020. tsakim/poibin. https://github.com/tsakim/poibin original-date:2016-05-02T08:40:41Z.

Waldspurger, Carl A, and William E Weihl. "Stride Scheduling: Deterministic Proportional-Share Resource Management," Technical Report MIT, 1995.

Zehlike, Meike, Francesco Bonchi, Carlos Castillo, Sara Hajian, Mohamed Megahed, and Ricardo Baeza-Yates. "FA*IR: A Fair Top-k Ranking Algorithm." In *Proceedings of the 2017 ACM on Conference on Information and Knowledge Management*. Singapore Singapore: ACM, 2017.

Meike Zehlike, Ke Yang, and Julia Stoyanovich. 2021. Fairness in Ranking: A Survey. arXiv:2103.14000 [cs] (May 2021). http://arxiv.org/abs/2103.14000 arXiv:2103.14000.

* cited by examiner

1: procedure GLS(Inputs: $x$ (the point to be decomposed, in the expohedron) $\gamma$ (the parameters of the PBM model) ; Outputs: the $n$ vertices $v^{(i)}, i=1,\ldots,n$ and their associated coefficients $\alpha_i, i=1,\ldots,n$, such that $x = \sum_i \alpha_i v^{(i)}$.)
2:    $R = 1.0$
3:    $x^{(1)} = x$
4:    for $i = 1, 2, \ldots, n$ do
5:      Take $v^{(i)}$ as the vertex in the zone of $x^{(i)}$
6:      $L_1 = \min_{k\ s.t.\ x_k^{(i)} > v_k^{(i)}} \frac{\gamma_1 - v_k^{(i)}}{x_k^{(i)} - v_k^{(i)}}$
7:      $L_2 = \min_{k\ s.t.\ v_k^{(i)} > x_k^{(i)}} \frac{v_k^{(i)} - \gamma_n}{v_k^{(i)} - x_k^{(i)}}$
8:      $b = \min(L_1, L_2)$
9:      Find $\lambda \in [1, b]$ and $x^{(i+1)} = v^{(i)} + \lambda(x^{(i)} - v^{(i)}))$ s.t. $x^{(i+1)}$ intersects a facet by the BiSection method.
10:      $\alpha_i = \frac{\lambda - 1}{\lambda} * R$
11:      $R = R - \alpha_i$
12:    end for
13: end procedure

FIG. 6

1: procedure Pareto(INPUT: $\gamma$, target exposure $v^{(0)}$, $\rho$)
2:     $G_k \leftarrow \sum_{i=1}^{k} \gamma_i$
3:     $V_k \leftarrow \sum_{i=1}^{k} v_i^{(0)}$
4:     $\mathcal{I}_0 \leftarrow \{n\}$    ▸ Initialize the set of splits
5:     $\rho^{(0)} \leftarrow \rho - (\rho^\top 1)1/n$    ▸ Project $\rho$ on the polytope
6:     $l \leftarrow 0$
7:     while $\rho^\top v^{(l)} < \rho^\top \gamma$ do    ▸ While utility is not maximal
8:         $D_k \leftarrow \sum_{i=1}^{k} \rho_i^{(l)}$
9:         $\lambda_l \leftarrow \min_k \left\{ \frac{G_k - V_k}{D_k} | D_k < 0 \right\}$
10:        $v^{(l+1)} \leftarrow v^{(l)} + \lambda_l \rho^{(l)}$    ▸ Compute the intersection
11:        $V_k \leftarrow \sum_{i=1}^{k} v_i^{(l)}$
12:        $\mathcal{I}_{l+1} = \{i_1, \ldots, i_{l+1}\} \leftarrow \text{which}(V_k == G_k)$    ▸ $\mathcal{I}_{l+1}$ is the set of splits identifying the current face.
13:        $\{i_j\} \leftarrow \mathcal{I}_{l+1} \setminus \mathcal{I}_l$    ▸ Identify the new split
14:        $\psi \leftarrow \sum_{m=i_{j-1}}^{i_j} \gamma_m / \sum_{m=i_j+1}^{i_{j+1}} \gamma_m$
15:        $v \leftarrow (0, \ldots, 0, \underbrace{1, \ldots, 1}_{i_{j-1},\ldots,i_j}, \underbrace{-\psi, \ldots, -\psi}_{i_j+1,\ldots,i_{j+1}}, 0, \ldots, 0)$    ▸ The new normal vector to the face that was just intersected.
16:        $\rho^{(l+1)} \leftarrow \rho^{(l)} - [(\rho^{(l)})^\top v]v/\|v\|_2^2$    ▸ Project $\rho$ on the new face
17:        $l \leftarrow l + 1$
18:     end while
19: end procedure, OUTPUT: a sequence of at most $(n-1)$ points $(v^{(l)})_{l \in \{1, \ldots, n-1\}}$ that defines the Pareto curve as the union of the line segments connecting these points.

FIG. 12

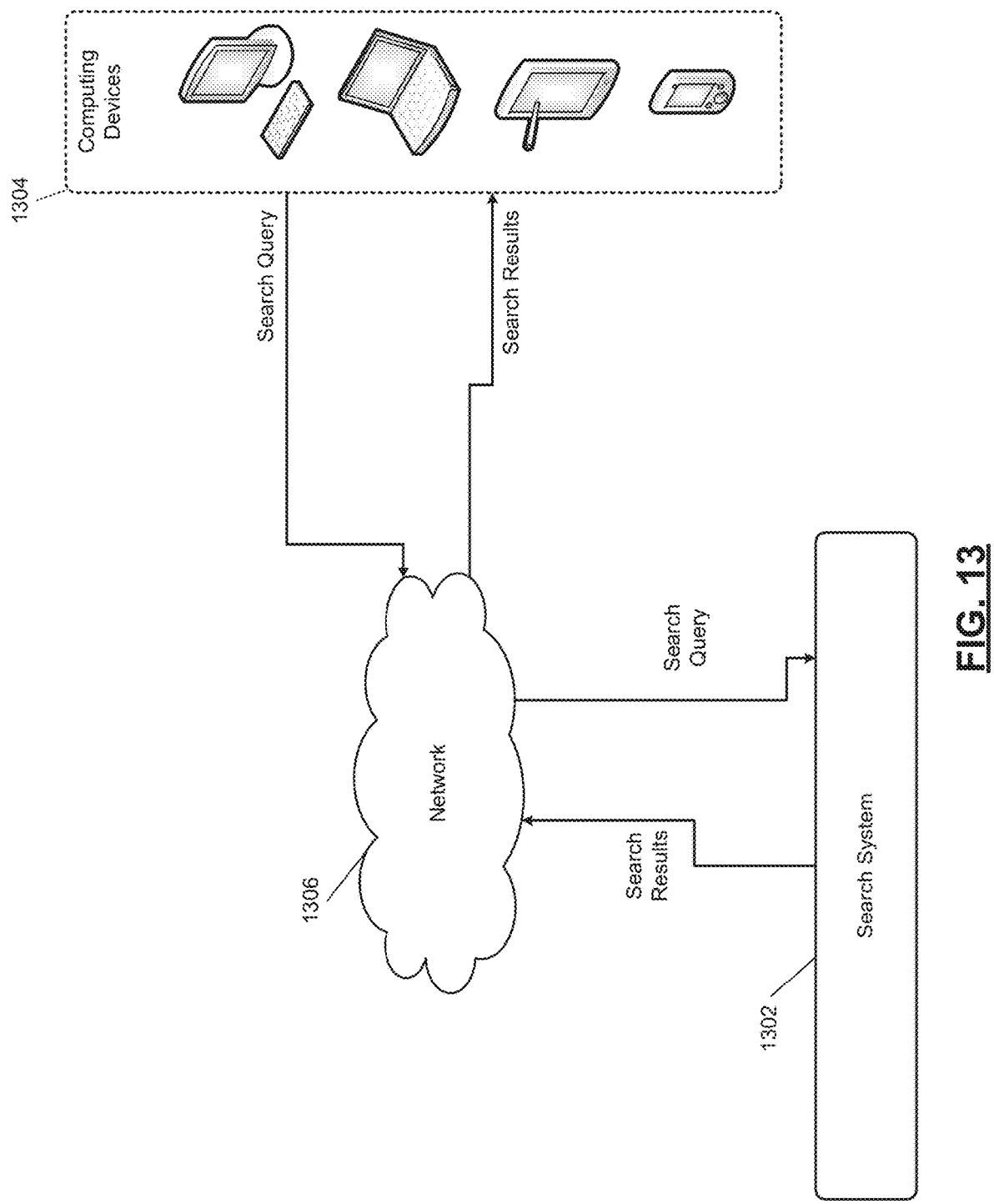

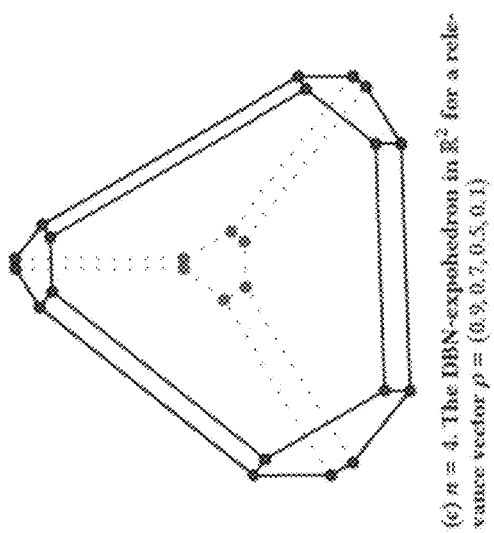
(c) $n = 4$. The DBN-expohedron in $\mathbb{R}^4$ for a relevance vector $\rho = (0.9, 0.7, 0.5, 0.1)$.
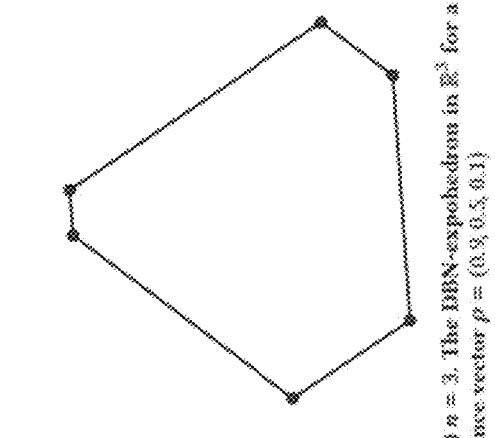
(b) $n = 3$. The DBN-expohedron in $\mathbb{R}^3$ for a relevance vector $\rho = (0.9, 0.5, 0.1)$.
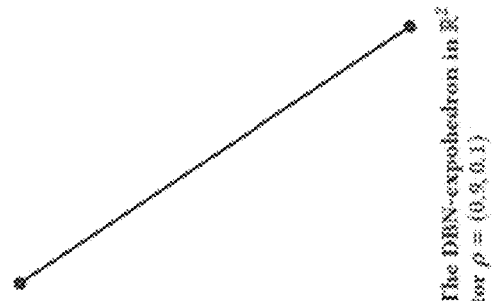
(a) $n = 2$. The DBN-expohedron in $\mathbb{R}^2$ for a relevance vector $\rho = (0.9, 0.1)$.
FIG. 17

A DBN-expohedron for $n = 2$ documents of relevances $\rho = (1, 0)$ with parameters $\gamma = \kappa = 0.5$. It is apparent that minimizing $\|\mathcal{E}\|_2^2$ does not lead to any interpretable notion of equity.

Algorithm 1 Check whether a point $x \in \mathbb{R}^n$ is inside $\Pi(y, \kappa, \rho)$ 1: procedure is_inside(INPUT: $x \in \mathbb{R}^n, \Pi(y, \kappa, \rho)$)
2:     $\pi \leftarrow \text{argsort}(x)$     ▷ Identify the zone of $x$
3:     $v \leftarrow \mathcal{E}(\pi)$     ▷ Create the zone's vertex
4:     is_inside $\leftarrow$ True
5:     if $v^T(x - v) \neq 0$ then
6:         is_inside $\leftarrow$ False
7:     end if
8:     for $s \in \{1, \ldots, n-1\}$ do
9:         if $v_s^T(x - v) > 0$ then
10:             is_inside $\leftarrow$ False
11:         end if
12:     end for
13: end procedure OUTPUT: is_inside

FIG. 19

Algorithm 2 Identify the smallest face in which a point is contained

1: procedure face_id(INPUT: $x \in \Pi(y, \kappa, \rho)$)
2:     $\pi \leftarrow \text{argsort}(x)$     ▷ Identify the zone of x
3:     $v \leftarrow \mathcal{E}(\pi)$     ▷ Create the zone's vertex
4:     $S \leftarrow \emptyset$
5:     for $s \in \{1, \ldots, n\}$ do
6:        if $v_s^T(v - x) = 0$ then
7:           $S \leftarrow S \cup \{s\}$
8:        end if
9:     end for
10: end procedure OUTPUT: The face $F = (\pi, S)$

FIG. 20

Algorithm 3 Our Carathéodory decomposition in the DBN-expohedron

1: procedure GLS(INPUT: $x \in \Pi(y, \kappa, \rho)$)
2:     $v_1 \leftarrow \mathcal{E}(\text{argsort}(x))$     ▷ Choose the initial vertex
3:     $a_1 \leftarrow 1$     ▷ Set the initial vertex's weight to 1
4:     $p_1 \leftarrow x$
5:     for $i \in \{1, \ldots, n\}$ do
6:         $p_{i+1} \leftarrow \max\{\lambda > 0 \mid x + \lambda(x - v_i) \in \Pi(y, \kappa, \rho)\}$ ▷
        Find the intersection with the border of the expohedron using
        a bisection search with is_inside
7:         $a_{i+1} \leftarrow a_i - \frac{\|p_i - p_{i+1}\|}{\|p_{i+1} - v_i\|} a_i$ ▷ Update convex coefficients
8:         $a_i \leftarrow \frac{\|p_i - p_{i+1}\|}{\|p_{i+1} - v_i\|} a_i$
9:         $v_{i+1} \leftarrow \mathcal{E}(\text{argsort}(p_{i+1}))$
10:     end for
11: end procedure OUTPUT: $a_1, \ldots, a_n, v_1, \ldots, v_n$

FIG. 22

Algorithm 4 An algorithm able to build the Pareto from of MOO problem (14) in the DBN-expohedron.

1: procedure Pareto(INPUT: Expohedron $\Pi(\gamma, \kappa, \rho)$, target exposure $v^{(0)} = \mathcal{E}^*$)
2:     $F = (\pi, S) \leftarrow$ face_id($v^{(0)}$)    ▷ Initialize splits
3:     $P \leftarrow$ Gram-Schmidt(($w_s \mid s \in S$))    ▷ Build the projection matrix $P$ on the linear subspace of $F$
4:     $\rho^{(0)} \leftarrow \rho - P\rho$    ▷ Project $\rho$ on the subspace
5:     $l \leftarrow 0$
6:     while $\rho^T v^{(l)} < \rho^T \mathcal{E}(\pi_{PRP})$ do    ▷ While utility is not maximal
7:       $k \leftarrow \max\{k \geq 0 \mid v^{(l)} + k\rho^{(l)} \in \Pi\}$    ▷ Do a bisection search with is_inside
8:       $v^{(l+1)} \leftarrow v^{(l)} + k\rho^{(l)}$
9:       $F = (\pi, S) \leftarrow$ face_id($v^{(l+1)}$)
10:       $P \leftarrow$ Gram-Schmidt(($w_s \mid s \in S$))    ▷ Build the projection matrix on the linear subspace of the new face $F$
11:       $\rho^{(l+1)} \leftarrow \rho - P\rho$    ▷ Project $\rho$ on the new face
12:       $l \leftarrow l + 1$
13:     end while
14: end procedure
15: OUTPUT: A sequence of at most $n$ points $(v^{(l)})_{l \in \{0,...,L\}}$. The Pareto-curve is the union of line segments of endpoints $\{v^{(l)}, v^{(l+1)}\}$.

FIG. 23

RANKING SYSTEMS AND METHODS USING A DYNAMIC BAYESIAN NETWORK EXPOSURE MODEL

CROSS-REFERENCE TO RELATED APPLICATIONS

The present disclosure claims priority to French Patent Application No. FR 2204288, filed on 5 May 2022. The present disclosure is a continuation-in-part of U.S. patent application Ser. No. 17/655,049, filed on 16 Mar. 2022, which claims priority to French Patent Application No. FR 2104801, filed on 6 May 2021, and European Patent Application Number EP21306565, filed Nov. 8, 2021. This application is related to U.S. application Ser. No. 17/530,883, filed on 19 Nov. 2021. The entire disclosures of the applications referenced above are incorporated herein by reference.

FIELD

The present disclosure relates to information retrieval systems and methods and more particularly to systems and methods for that balance utility and fairness in ranking objects in information retrieval.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally, information retrieval and recommendation involve two stages. The first stage focuses on retrieving a candidate set of results and the second stage focuses on ranking the candidate set of results.

The candidate set of results may include search results (e.g., lists of links to documents from search results in response to a query) and recommendations (e.g., lists of Points-Of-Interest recommendations in response to an identified location, or lists of recommendations of songs in response to genre selection, etc.).

For instance, for information retrieval, a query may be input to a first-stage retriever, which processes the query (for example, based on relevance), and accordingly retrieves a set of documents. A second-stage or ranker (or re-ranker) then ranks the retrieved set of documents and outputs a ranked set of documents, which, for instance, can be equal to or fewer in number than the first set.

Users (e.g., content consumers) expect the most relevant results to have the highest exposure, whereas providers (e.g., content producers) seek to have a fair (or equitable) exposure to their content. Hence, when ranking the candidate set of results in the second stage, it is preferred that the ranking method balances between utility (which represents users who access the set of results) and fairness (which represents the providers who make up the set of results).

While some ranking methods exist that balance utility and fairness, their complexity is generally prohibitive to enable their use in any realistic scenario. Hence, there continues to be a need for an optimal method (e.g., capable to compute exact optimal solutions) which complexity is reduced compared to existing methods so as to enable Web-scale fair-useful ranking, for instance.

SUMMARY

Example methods of the present disclosure provide according to a first aspect a computer-implemented method for ranking a set of objects that includes: receiving the set of objects and a set of objective functions; defining a decision space having n decision variables using a permutohedron, where n is the number of objects to rank and where vertices of the permutohedron represent permutations of exposures provided to the objects in the set by corresponding rankings; determining a Pareto-set for the set of objective functions; with a Pareto-optimal point in the Pareto-set, determining a distribution over rankings for the objects in the set using the decision space, where a proportion is associated to each ranking in the distribution; selecting a sequence of rankings for the objects in the set from the distribution over rankings in accordance with their proportions; and outputting the selected sequence of rankings.

Example systems and methods of the present disclosure provide according to a second feature a computer-implemented method that includes: receiving a query from a computing device; determining a set of items to be ranked based on the query; determining relevance scores for the items, respectively; determining a polytope using an exposure model based on the relevance scores; determining a point that lies within the polytope; performing a Carathéodory decomposition; generating a distribution for the items based on a result of the Carathéodory decomposition; sampling from the distribution; determining rankings for the items based on the sampling; and transmitting the rankings of the items to the computing device.

In further features of the methods according to the first and second aspects, the exposure of a document may depend only on its rank, or alternatively, also on the ranks and relevances of other documents. Unlike a Position-Based Model (PBM) which assumes that the exposure of an object only depends on its rank to generate a list of exposures for documents, a Dynamic Bayesian Network (DBN) model includes a parametric function that, given a ranking and documents' relevances, respectively, generates a list of exposures for the documents.

According to a third, a fourth, a fifth, and a sixth feature, respectively, the present disclosure may provide: a computer program product comprising code instructions which, when the program is executed on a computer, cause the computer to perform the method according to the first and second aspects of the present disclosure; a computer-readable medium having stored thereon the computer program product; a data processing device comprising a processor configured to perform the method according to the first and second aspects of the present disclosure; and/or a system for information retrieval including a computer-implemented first-stage retriever configured to receive a query and generate a set of objects, and a computer-implemented second-stage ranker configured to rank the set of objects according to the first and second aspects of the present disclosure.

In a feature, a computer-implemented method for ranking a set of objects includes: receiving the set of objects to rank, a relevance score for each object in the set, and a set of objective functions; based on the relevance scores for the objects, defining a decision space having n decision variables using a polytope, where n is the number of objects to rank and where vertices of the polytope represent permutations of exposures provided to the objects in the set by corresponding rankings; determining a Pareto-set for the set of objective functions; based on a Pareto-optimal point in the Pareto-set, determining a distribution over rankings for the objects in the set using the decision space, where a proportion is associated with each ranking in the distribution; selecting a sequence of rankings for the objects in the set based on the distribution in accordance with their proportions; and outputting the selected sequence of rankings of the objects.

In further features, the set of objective functions comprises a quadratic function and a linear function.

In further features, the quadratic function comprises a fairness function, and the linear function comprises a utility function.

In further features, the fairness function is a normalized function of the difference between a vector made up of decision variables and a target vector.

In further features, the fairness function is a normalized function.

In further features, the normalized function is a squared L2-norm function.

In further features, the method further includes: receiving a list of exposures provided to the objects in the set, a ranking fairness objective function, and a ranking utility objective function, where defining the decision space includes determining the decision space based on the relevance scores and the list of exposures, and where determining the Pareto-set includes determining the Pareto-set within the decision space based on the ranking fairness objective function and the ranking utility objective function.

In further features, determining the distribution includes: receiving a point in the Pareto-set which translates to a target exposure across the objects in the set within the decision space; and using the target exposure, determining the distribution which achieve on average the target exposure for the objects in the set, each ranking corresponding to a vertex in the decision space.

In further features, the determining the distribution includes, for the number of objects in the set: (i) determining a vertex of the decision space; (ii) drawing a line starting at the vertex through the target exposure until the line intersects a face of the polytope; and (iii) repeating (i) and (ii) on the intersected face of the polytope using the new intersection point instead of the target exposure, until the newly intersected face is a second vertex, where each vertex of the decision space has an associated proportion in the distribution.

In further features, the set of objective functions includes a fairness function and a utility function.

In further features, the fairness function includes at least one of a meritocratic fairness function and a demographic fairness function.

In further features, the polytope is determined based on the relevance score using an exposure model with exposures that depend on a document's rank.

In further features, the polytope is determined based on the relevance score using an exposure model with exposures that depend on a document's rank and a document's relevance.

In further features, the polytope is determined based on the relevance score using an exposure model with exposures that depend on a document's rank and a document's relevance and ranks of other documents and relevances of the other documents.

In further features, determining the distribution includes determining the distribution using a Grotschel, Lovasz and Schrijver (GLS) procedure.

In further features, the selecting a sequence of rankings includes selecting the sequence of rankings using one or more of stochastic sampling, Low-Discrepancy Sequences, additive-recurrence sequences, Stride Scheduling, or m-balancing.

In further features, the objects in the set include documents.

In further features, the method further includes identifying the objects in the set in response to a query.

In further features, the objects in the set include recommendations.

In further features, the method further includes identifying the objects in the set in response to a location.

In further features, outputting includes displaying at least a subset of the set of objects on a display ranked according to the selected sequence of rankings.

In a feature, a computer-implemented method includes: receiving a query from a computing device; determining a set of items to be ranked based on the query; determining relevance scores for the items, respectively; determining a polytope using an exposure model based on the relevance scores; determining a point that lies within the polytope; performing a Carathéodory decomposition; generating a distribution for the items based on a result of the Carathéodory decomposition; sampling from the distribution; determining rankings for the items based on the sampling; and transmitting the rankings of the items to the computing device.

In further features, the exposure model is one of a Position-Based Model (PBM) and a Dynamic Bayesian Network (DBN) model.

In further features, the Carathéodory decomposition includes selecting a vertex of the polytope, finding an intersection of a line with a border of the polytope using a bisection search.

In further features, the result of the Carathéodory decomposition includes vertices of the polytope and coefficients for the vertices, respectively.

In further features, the determining the point includes determining a smallest dimension face upon which the point lies.

In further features, the face is one of a vertex, an edge, a face, and the polytope.

In further features, the determining the smallest dimension face includes determining a number of adjacent faces upon which the point lies.

In further features, the sampling includes one of sampling from the distribution using one of random sampling and m-balanced words sampling.

In further features, the determining the rankings includes: determining a face of the polytope upon which the point lies; determining a projection on a plane of the face; projecting the projection on the plane; and finding the point on the projection where a utility of the rankings is a maximum utility.

In further features, the determining the ranks further includes: determining a second face of the polytope upon which the point lies; determining a second projection on a second plane of the second face; projecting the second projection on the second plane; and finding the point on the second projection where the utility of the rankings is the maximum utility.

In further features, the polytope is asymmetrical.

In further features, the determining the polytope includes determining the polytope further based on a continuation probability value and a satisfaction probability value.

In further features, the continuation probability value corresponds to a probability of a user stopping reviewing the items.

In further features, the satisfaction probability value corresponds to a probability of a user being satisfied with one of the items.

In a feature, a system includes: one or more processors; and memory including code that, when executed by the one or more processors, perform to: receive a query from a computing device; determine a set of items to be ranked based on the query; determine relevance scores for the items, respectively; determine a polytope using an exposure model based on the relevance scores; determine a point that lies within the polytope; perform a Carathéodory decomposition; generate a distribution for the items based on a result of the Carathéodory decomposition; sample from the distribution; determine rankings for the items based on the sampling; and transmit the rankings of the items to the computing device.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 12 sets out pseudo code for an example Pareto-set identification method;

FIG. 13 includes a functional block diagram of an example environment including a search system configured to provide search results in response to queries;

FIG. 17 includes example surfaces generated by a DBN model based on 2 (left), 3 (middle), and 4 (right) items given different relevance vectors;

FIG. 19 is pseudo code for an example algorithm for checking whether a point is inside of a polytope generated using a DBN exposure model;

FIG. 20 is pseudo code for an example algorithm for identifying a smallest face of a polytope upon which a point is contained;

FIG. 22 is pseudo code for an example algorithm for the Carathéodory decomposition;

FIG. 23 includes an algorithm to determine the pareto-optimal set to solve the MOO problem for the DBN expohedron;

In the drawings, reference numbers may be reused to identify similar and/or identical elements.

DETAILED DESCRIPTION

Figure 1:
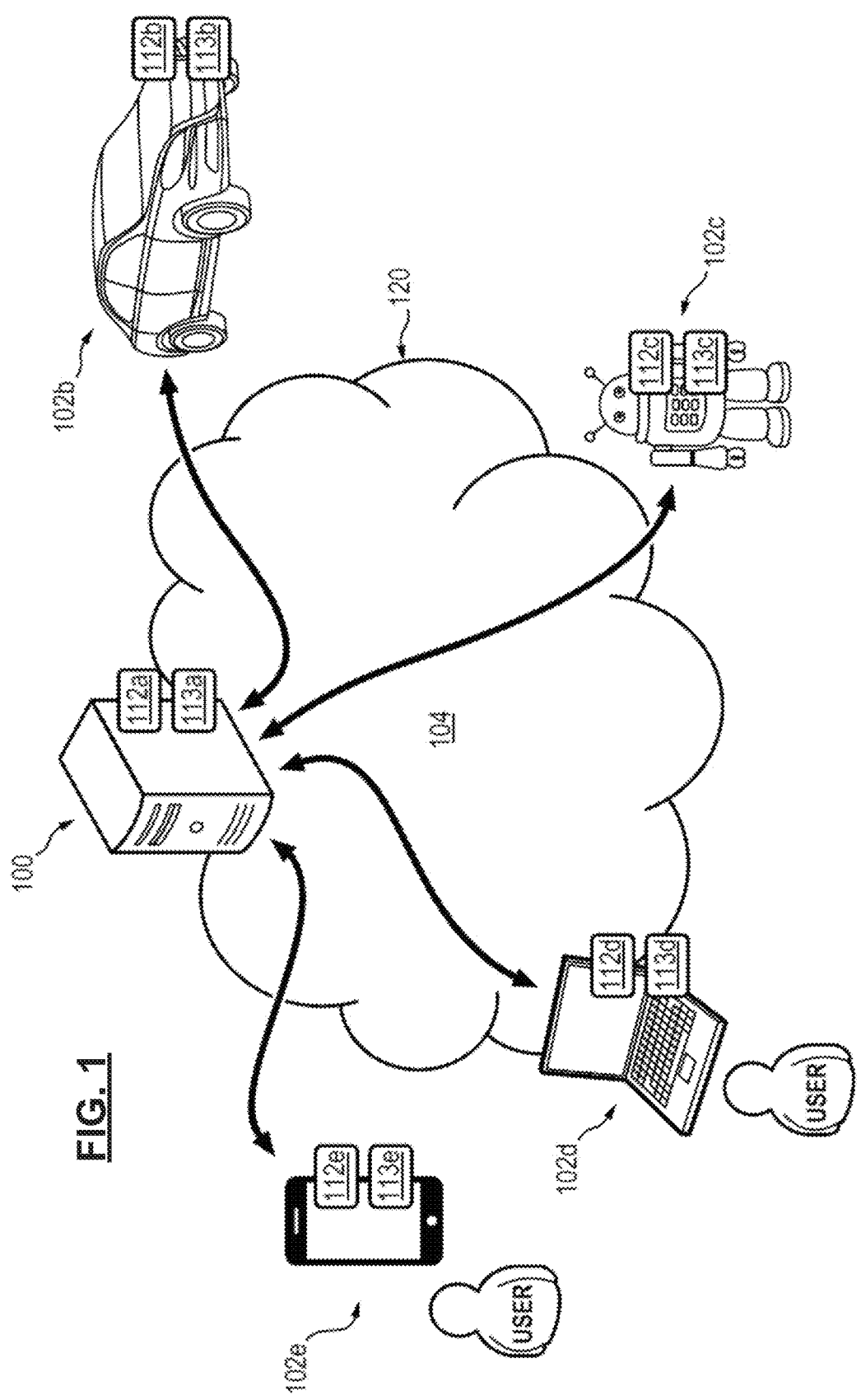
FIG. 1 illustrates an example of architecture in which the disclosed methods may be performed.

The disclosed computer-implemented methods and embodiments for ranking objects may be implemented within an architecture (e.g., a network or system architecture) such as illustrated in FIG. 1, which includes server 100 and one or more computing devices 102 that communicate over a network 104 (which may be wireless and/or wired) such as the Internet for data exchange. Server 100 and the computing devices 102 include a data processor 112 and memory 113 such as but not limited to random-access memory (RAM), read-only memory (ROM), hard disks, solid state disks, or other non-volatile storage media. Memory 113 may also be provided in whole or in part by external memory or storage in communication with the data processor 112. The computing devices 102 may be any device that communicates with server 100.

Example methods provided herein may be implemented by a processor such as the processor 112 or other processor in the server 100 and/or computing devices 102. It will be appreciated that the processor 112 can include either a single processor or multiple processors operating in series or in parallel. Memory used in example methods may be embodied, for instance, in memory 113 and/or suitable storage in the server 100, computing devices 102*b-e*, a connected remote storage, or any combination. Memory can include one or more memories or memory elements or structures, including combinations of memory types and/or locations. Data in memory can be stored in any suitable format for data retrieval and processing.

Server 100 may include, but is not limited to, dedicated servers, cloud-based servers, or a combination (e.g., shared). Data streams may be communicated from, received by, and/or generated by the server 100 and/or the computing devices 102*b-e*.

Computing devices 102*b-e* may be any processor including computing device, terminal, etc., and/or may be embodied in an application executable by a processor including device, etc. Computing devices may be disposed within the server 100 and/or external to the server (local or remote, or any combination) and in communication with the server. Example computing devices 102*b-e* include, but are not limited to, autonomous vehicle 102*b*, robot 102*c*, computer 102d, mobile communication devices (e.g., smartphones, tablet computers, etc.) such as smartphone 102e, as well as various other types of processor including computing devices not shown in FIG. 1 such as but not limited to virtual reality (VR), augmented reality (AR), or mixed reality (MR) devices, wearable computers, etc. Computing devices 102b-e may be, but need not be, configured for sending data to and/or receiving data from the server 100, and may include, but need not include, one or more output devices, such as but not limited to displays, speakers, printers, etc. for displaying, announcing, or printing results of certain methods that are provided for display by the server. Computing devices may include combinations of computing devices.

Example methods provided herein address the problem of designing optimal fair-useful ranking policies efficiently using a set of optimization/decision variables. A first feature of example methods chooses as optimization/decision variables "item exposure" variables that act as key links between important objectives in what constitutes an ideal ranking: in particular a utility objective, which represents typically the utility to a user or consumer viewpoint, and a fairness objective, which represents typically a fairness from the provider or supplier viewpoint.

Advantageously, a second feature of example methods can express the optimization problem with only n decision variables in a decision space which is (e.g., can be represented by) a generalized permutohedron, where n is the number of objects (e.g., documents) to rank, while keeping the expressiveness of the policy to fully control the utility and fairness objectives separately and exactly. Vertices of example permutohedrons disclosed can represent the exposure associated with a corresponding rank, and such permutohedrons are referred to herein as Expohedrons. The decision space provided by the permutohedron (e.g., Expohedron) allows one to represent any distribution (or convex combination) over rankings (or, synonymously, over permutations) and to reason geometrically in this space to solve the Utility-Fairness trade-off. In particular, the whole Pareto set of the MOO (Multi-objective Optimization) problem can be obtained without passing through explicit scalarisation techniques, thus reducing required processing time and resources.

Example methods can determine the optimal policy using unbiased estimates of relevance scores with uniform estimation quality over the objects and an exposure model with known structure and parameters.

Example methods operate with a complexity of $O(n^2 \log n)$. For a DBN model, complexity may be $On^3$. Such methods can apply geometric reasoning. Some of the method's steps may be expressed in closed-form equations. Others of the method's steps can be provided by sorting operations. Moreover, the entire Pareto-set can be generated analytically and geometrically, without relying on, for example, a scalarization technique to scan the entire frontier.

Figure 2:
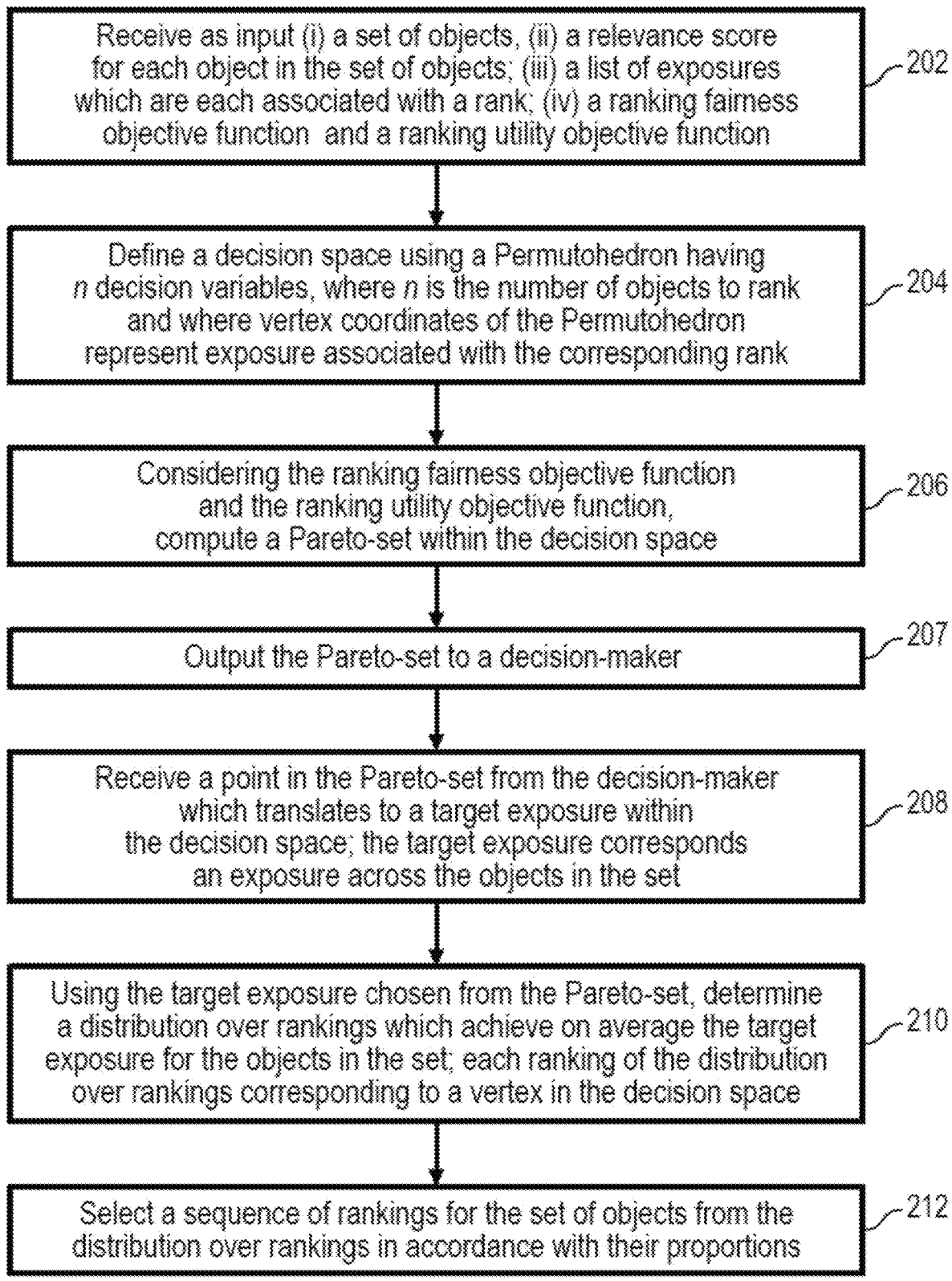
FIG. 2 illustrates a flow diagram setting out an embodiment of the disclosed method.

FIG. 2 illustrates a flow chart of an example embodiment of the disclosed methods for ranking a set of objects. The method according to the embodiment of FIG. 2 may be performed at server 100 (by one or more processors), and the example method is described with respect to server 100. However, it will be appreciated that the method can likewise be performed by a computing device 102, or by a combination of server 100 and computing device 102.

At 202, server 100 receives from any suitable source(s), including external and/or internal sources, a set of objects, a (e.g., unbiased) relevance score for each object in the set of objects, a list of exposures which are each associated with a rank, and objective functions including a ranking fairness objective function and a ranking utility objective function. At 204, server 100 defines a decision space using a permutohedron having n decision variables, where n is the number of objects to rank and where vertices of the permutohedron represent permutations of exposures provided to the objects in the set by corresponding rankings.

At 206, using the ranking fairness objective function and the ranking utility objective function, server 100 computes a Pareto-set (i.e., the set of non-dominated solutions where there are no other solutions that are better for all objective functions; for example, where there are no exposures that offer larger utility and better fairness at the same time) within the decision space defined by the list of exposures between a first point representing optimal fairness and a second point representing optimal utility. Optimal fairness types in example methods may include, for instance, demographic fairness and/or meritocratic fairness. As described in more detail below, an ideal exposure for demographic fairness allows equal exposure, whereas for meritocratic fairness exposure may be defined based on relevance (e.g., defined using a vector of relevance). In yet other embodiments, an optimal fairness type may be additionally or alternatively customized based on a defined proportion other than fairness (e.g., for allocating prize money to be paid).

Example fairness types consider individual fairness as opposed to group fairness. Individual fairness tries to ensure equity at the level of individual objects, while group fairness assumes that objects can be related to groups and that the equity is ensured at the group level, typically preventing some minority group to be disadvantaged.

At 207, the server 100 outputs (internally or externally) the Pareto-set to a decision-maker (e.g., module). At 208, server 100 receives (internally or externally) a point in the Pareto-set which translates to a target exposure within the decision space. This target exposure corresponds to an exposure across the objects in the set. The target exposure in an embodiment may be defined by a decision-maker internal or external to the server 100 that sets a defined utility/fairness trade-off, which could be set on a case-by-case basis or more generally as fixed constraints (e.g., set constraints where fairness does not fall below a predefined threshold). In some embodiments the decision-maker may be an administrator. In other embodiments the decision-maker may be an automated system. A combination of administrators and automated systems may also be used.

At 210, using the target exposure received from the decision-maker as an optimal trade-off in the Pareto-set, server 100 determines a distribution over rankings (e.g., a weighted set of rankings) which achieve on average the target exposure for the objects in the set, where each ranking of the distribution over rankings corresponds to a vertex in the decision space. In one embodiment, determining the distribution over rankings can be performed as follows: (i) an arbitrary vertex of the decision space is determined; (ii) a line is drawn (e.g., computed) starting at the arbitrary vertex through the target exposure received from the decision-maker until the line intersects a face of the decision space; (iii) the steps (i) and (ii) are repeated on the intersected face of the decision space using the intersection point instead of the decision-maker's target exposure, until the newly intersected face is a vertex. Steps (i)-(iii) can be performed as many times as there are objects in the set, depending on when the intersection is a vertex at step (iii). Each vertex of the decision space has an associated proportion.

At 212, server 100 deploys the distribution over rankings by selecting a sequence of rankings for the set of objects from the distribution over rankings in accordance with their proportions.

In other embodiments, as mentioned above, the method according to the embodiments of FIG. 2 may be performed at computing device 102 partially or completely. In yet other embodiments, the method may be performed at a different server or computing devices or on a plurality of servers in a distributed manner.

In one example embodiment, a (e.g., non-personalized) query (e.g., a query made by an anonymous user) is received repeatedly for general points of interest at a defined map location. The set of objects in this exemplary embodiment may be a list of general points of interest such as restaurants, museums, shops, and gas stations. In another exemplary embodiment, a (e.g., non-personalized) keyword query is received repeatedly by a search engine. The set of objects in this exemplary embodiment may be a list of links to documents such as web pages. As these queries are repeated over time, the ordering of the sets of objects varies in accordance with their respective sequence of rankings to achieve their target exposure.

Based on the selected sequence of rankings at 212, one, all, or a subset of the set of objects can be presented, e.g., in a Search Engine Result Page (SERP) that is prepared and provided, e.g., transmitted, to an external or internal computing device for output (e.g., displaying, audibly announcing, printing, importing, exporting, storing, etc.). For instance, a SERP including one, a subset, or all of the objects, where such objects are respectively located based on their determined rank within the selected sequence, can be generated and transmitted to a terminal of a server 100 or computing device 102 for displaying on a display. If one or a subset of the objects are presented in the SERP instead of all objects, such presented objects may be, for instance, those objects having a respectively higher ranking in the selected sequence than others in the set of objects. The objects in the SERP may be ordered according to rank, such as from highest rank to lowest rank.

Exposure, also known as "attention" or "examination" in the field of Information Retrieval (IR), can be defined as the probability that the user will examine an object (such as but not limited to a document) in a certain location of a Search Engine Result Page (SERP). Exposure values (e.g., forming part of the list of exposures received at step 202(*iii*) in FIG. 2) can be captured by methods such as but not limited to eye-tracking studies or by interventional harvesting (e.g., by putting the same document for the same query at two different ranks). The exposure values may also be determined by methods employing "click models" (i.e., user browsing models) as will be appreciated in the art of Information Retrieval (e.g., as disclosed in Chuklin et al., "Click models for web search", published in Synthesis Lectures on Information Concepts, Retrieval, and Services, 7(3):1-115, July 2015). These models may try to explain the click behavior by a natural sequence of two steps: first examine (or turn one's attention to) an item or its representative snippet, then click on it, if it looks attractive.

From the consumer's (i.e., user's) viewpoint, the consumer desires the more relevant objects be given a higher exposure, so as not to spend time looking for relevant objects in a poorly visible location of the SERP. This desire by the consumer may be expressed in example methods by defining the utility of a ranking as the dot product between an exposure vector (i.e., the vector made up of the exposure values provided by the ranking to each object) and a gain vector (i.e., the vector made up of the gains of each object, the gain of an object being defined by an arbitrary monotonically increasing function of the relevance score of the object). Known information retrieval utility measures such as but not limited to Discounted Cumulative Gain (DCG) and Expected Reciprocal Rank (ERR) reflect this formulation, with particular choices of the exposure model parameters. DCG, for instance, assumes that the exposure of an object at rank k is given by $1/\log_2(1+k)$ and that the gain function g(d) is given by $g(d)=2^{rel(d)}$, where rel(d) is the relevance score of d. The ERR measure is based on the cascade model and assumes that the exposure depends on the relevance of previous objects in the list; in particular, once a user is satisfied with an object, the exposure of the next objects in the list will be zero.

From a provider's viewpoint, the provider would like that their own objects have a higher exposure in the SERP. However, because there are many providers, a non-disparate treatment of the objects presented to users may be desired.

Both the consumer's and the provider's viewpoints, which correspond respectively to a "Utility" objective and "Fairness" criteria, can be expressed in example methods disclosed herein in terms of "exposure." Exposure acts as a link between objectives of an ideal ranking: the utility objective (e.g., which represents the user or the consumer viewpoint) and the fairness criterion (e.g., which represents the object provider or supplier viewpoint).

Figure 3:
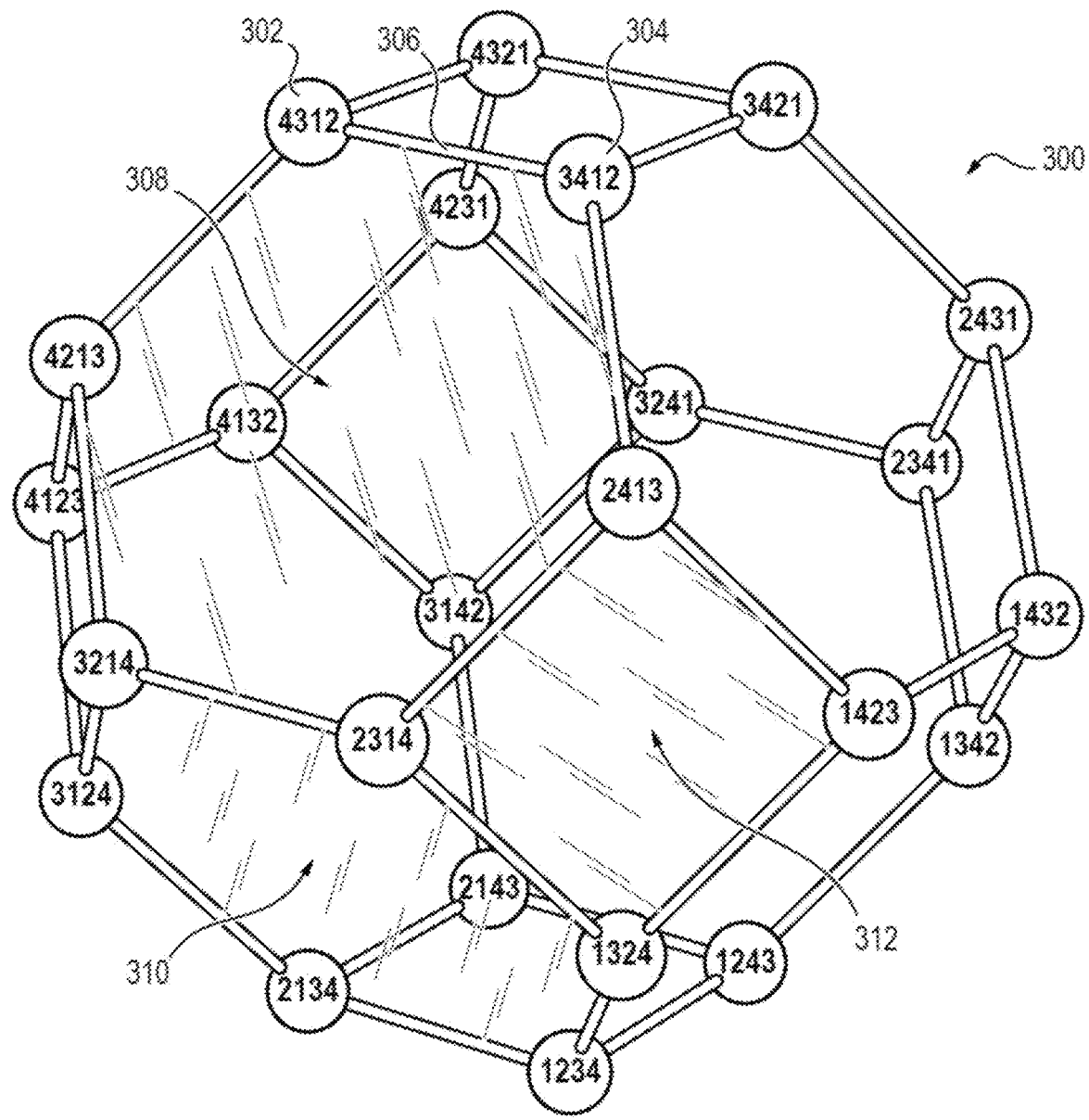
FIG. 3 illustrates an example permutohedron for n=4.

An example permutohedron is a polytope, where each vertex corresponds to a particular ranking or permutation over n objects (e.g., documents) and the polytope is the convex hull of these vertices. This polytope is embedded in an n-dimensional space, but may actually be (n−1) dimensional. For example, FIG. 3 represents, for n=4 objects, a 3-D object 300, which looks somewhat like a ball with a mix of hexagonal and squared facets. Consider the vertex (4 3 1 2) at 302: it represents a ranking that puts document $d_1$ at rank 4, document $d_2$ at rank 3, document $d_3$ at rank 1 and document $d_4$ at rank 2. Consider further the edge 306 linking the vertices (4 3 1 2) at 302 and (3 4 1 2) at 304: it represents any distribution (or convex combination) over the two rankings.

In addition, every facet of the 3-D object 300 represents a partial ordering of the n objects into two groups. For example, the facet 308 including vertices (4 3 1 2), (3 4 1 2), (2 4 1 3), (2 3 1 4), (3 2 1 4), and (4 2 1 3) represents a partial ordering where $d_3$ is always first (i.e., $d_3$ @ rank 1) followed by the three other documents in any order; the facet 310 including vertices (3 2 1 4), (2 3 1 4), (1 3 2 4), (1 2 3 4), (2 1 3 4), and (3 1 2 4) represents a partial ordering where $d_4$ is always last (i.e., $d_4$ @ rank 4) preceded by the three other documents in any order; and the squared facet 312 including vertices (2 4 1 3), (1 4 2 3), (1 3 2 4), and (2 3 1 4) represents a partial ordering where $d_1$ and $d_3$, in any order for the first two positions, followed by $d_2$ and $d_4$, in any order for the last two positions (i.e., ($d_1$ and $d_3$) before ($d_2$ and $d_4$)).

More generally, each face of dimension (n−k), which generalizes the notion of facet by following a hierarchy with decreasing dimensionality (e.g., facet→edge→vertex for n=4) represents all possible distributions (or convex combinations) respecting a certain partial ordering of the n objects into k groups. Referring again to FIG. 3, the edge 306 linking the vertex (4 3 1 2) at 302 and the vertex (3 4 1 2) at 304 corresponds to the partial order: $d_3$ first, $d_4$ second, followed by $d_1$ and $d_2$ in any order.

Carathéodory's theorem states that any point in the convex hull of a set P of m points $v_i$, embedded in a d-dimensional space ($v_i \in$ by $R^d$ $\forall i=1, \ldots, m$) can be decomposed using a Carathéodory decomposition algorithm into a convex combination of at most (d+1) of these points.

When the permutohedron is considered as a special case, any point of the permutohedron, which is a d-dimensional object with d=(n−1) (n designating the number of objects), can be decomposed into a distribution over at most n rankings. In an embodiment a procedure known as the GLS procedure (Grotschel, Lovasz and Schrijver) can be used to determine one such decomposition (in general, more than one single decomposition is possible). An example of the GLS procedure (see Grotschel et al., "Geometric Algorithms and Combinatorial Optimization," published in Springer Science & Business Media, December 2012) is illustrated in FIGS. 4A-4C for an n=3 polytope as it is applied to the methods disclosed herein.

Figure 4C:
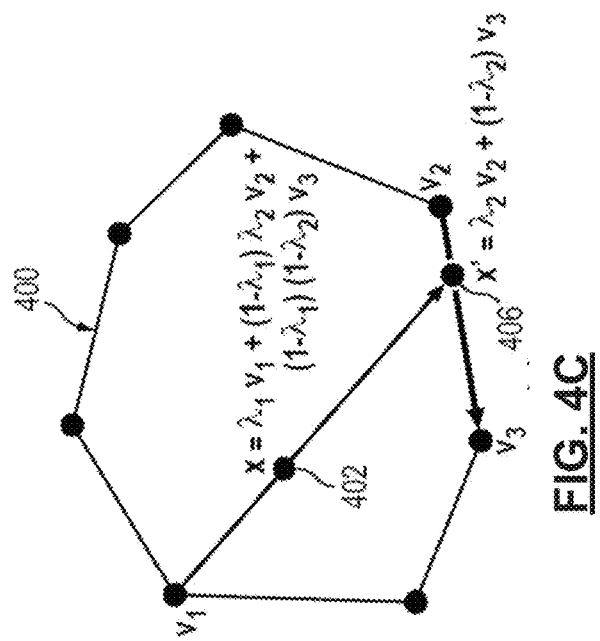
FIGS. 4A-4C illustrate a procedure for decomposing a point in the permutohedron into a combination of at most n of the permutohedron's vertices.
Figure 4B:
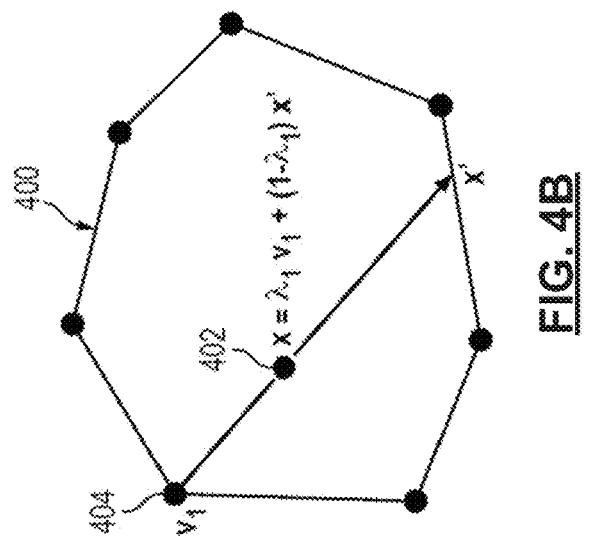
Figure 4A:
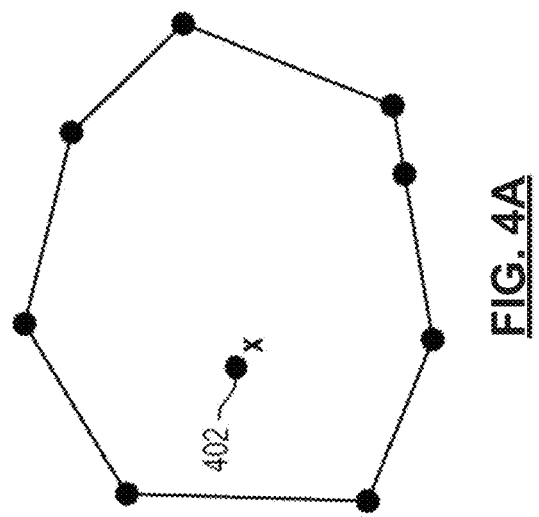

FIG. 4(a) shows a point x to be decomposed at 402. As shown in FIG. 4(b), the procedure starts by choosing any vertex $v_1$ at 404 of the polytope 400 (n=3) and extending the line segment going from $v_1$ to x (the point 402 to be decomposed) until intersecting a face of dimension (n−2). This gives a new point x', where x can be expressed as a convex combination of $v_1$ and x' (i.e., $x = \lambda_1 v_1 + (1-\lambda_1) x'$).

As shown in FIG. 4(c), the point x' 406 on the (n−2)-dimensional face can itself be decomposed by the same procedure by choosing any vertex belonging to the face of x' (referred to as $v_2$) and extending the line segment $v_2$–x' until it intersects with a face of dimension (n−3). In the example case shown in FIG. 4(c), n=3 so that this face is a vertex ($v_3$) and the procedure stops at this point: the initial point x is now expressed as the convex combination of three vertices (i.e., $x = \lambda_1 v_1 + (1-\lambda_1)\lambda_2 v_2 + (1-\lambda_1)(1-\lambda_2) v_3$). In general, with higher values of n, these recursive steps are repeated, each time considering a face of decreasing dimension until reaching a face of dim 0 (i.e., a vertex).

Example ranking methods set forth herein will now be described in further detail. The following notation is used for the purpose of formally describing features of example methods:

a) q is a query, which may be repeated an indefinite number of times by a single (e.g., anonymous) user (such as a consumer); it is noted that the query is not necessarily a textual query in the usual 'Information Retrieval' sense but should be understood in a broad sense; for instance, the query can also include any triggering context in a "Recommendation" setting.

b) for query q, there is a fixed candidate set of n objects (e.g., documents, Points-of-Interest (POI), recommendations, etc.), $D = (d_1, \ldots, d_n)$, whose relevance scores with respect to query q are denoted as $\rho = (\rho_1, \ldots, \rho_n)$; and c) A ranking policy $\pi(q)$ is a distribution (such as a convex combination) over m rankings with $$m \leq n \quad \sigma_i(i = 1, \ldots, m) : \pi(q) = \sum_{i=1}^{m} \alpha_i \sigma_i$$

where each ranking al maps each object $d_j$ to a rank $\sigma_i(d_j)$. Using a distribution on at most n rankings (m≤n) is a consequence of the Carathéodory's theorem as used in the permutohedron as used in example methods. As described in more detail below, ranking policy $\pi(q)$ can be deployed as a sequence of rankings that is as close as possible to the proportions given by the $\alpha_i$ coefficients. The goal is to find a set of policies $\pi^*(q)$ which are optimal with respect to a multi-objective optimization problem including utility and fairness criteria.

Example methods can use a ranking policy, denoted herein as $\pi(q)$, that is both useful and fair by ranking objects (e.g., consumer-oriented utility and provider-oriented fairness) in terms of a single set of decision/optimization variables, which variables are referred to herein as control levers. The control levers define an exposure vector, denoted as $\in_{\pi(q)}$. This vector is indexed by object (the first component corresponds to document $d_1$, etc.). This means that, instead of working directly in a decision space defined using a permutohedron where vertex coordinates represent ranks, a modified polytope, referred to herein as an Expohedron, can be used by the disclosed method, where vertex coordinates represent the exposure associated with the corresponding rank. In other words, vertices of the Expohedron represent permutations of exposures provided to the objects by corresponding rankings. While there can exist a 1:1 correspondence between the permutohedron and the Expohedron, the Expohedron directly represents the control lever space (i.e., decision space). Referring again to the exposure vector, denoted as $\in_{\pi(q)}$: the ranking policy is a distribution over m rankings maximum (m≤n), $$\epsilon_{\pi(q)} \sum_{i=1}^{m} \alpha_i \epsilon_{\sigma_i},$$

where $\in_{\sigma_i}$ is the vector of exposures that the ranking $\sigma_i$ is offering to the objects.

This optimization problem may be expressed as a multi-objective optimization problem. A Pareto-set (i.e., the set of feasible non-dominated solutions) can be determined by geometric reasoning. Then, a particular trade-off in this determined Pareto-set can be selected or determined, e.g., by a decision-maker, where the trade-off is one target point in the decision space (i.e., a target exposure). This point can be decomposed as a convex combination of at most n rankings, as known from Carathéodory's theorem as provided above.

Once this combination is determined, it (i.e., the ranked/ordering of a set of objects from the distribution over rankings) may be deployed through a fair scheduling strategy, which in one embodiment uses low-discrepancy sequences, such as the golden-ratio low-discrepancy sequences (see "Weighted Round Robin (Weighted Random Integers) Using the Golden Ratio Low Discrepancy Sequence", published on the Internet at demofox.org, June 2020). Other scheduling strategies could be used in alternate embodiments such as but not limited to algorithms similar to m-balanced words or, equivalently, Stride Scheduling.

An advantage of example methods is that several or even most steps may be performed using geometric reasoning, which in practice, leads to simple algebraic, closed-form solutions. A further advantage of example methods is that they offer a time complexity in $O(n^2 \log(n))$. Yet a further advantage of example methods is that they operate in an n-dimensional space, instead of, for instance, an n!-dimensional space or an $n^2$-dimensional space. Consequently, the number of decision/optimization variables employed by example methods is not larger than n, allowing any optimal solution as a distribution over only n rankings at maximum to be implemented.

Example methods can be provided for a general class of exposure models referred to as a "Position-Based Model" (PBM). This family of models assumes that the exposure of an object only depends on its rank. Each rank k is then associated with a parameter $\gamma_k$ which represents the probability that this rank will be examined by the user. Other classes of models may be processed using example methods.

In embodiments, an example method uses a PBM-type exposure model, characterized by a fixed set of n parameters $\gamma=(\gamma_1, \gamma_2, \ldots, \gamma_n)$. Without loss of generality, it is assumed that the $\gamma_k$ are sorted by decreasing value. This does not necessarily imply that the examination probabilities are decreasing with the rank, even if it often is the case in practice. Under this model, the sum of object (e.g., document) exposures in a ranked list is always the same and equal to $$\sum_{k=1}^{n} \gamma_k.$$

Figure 5:
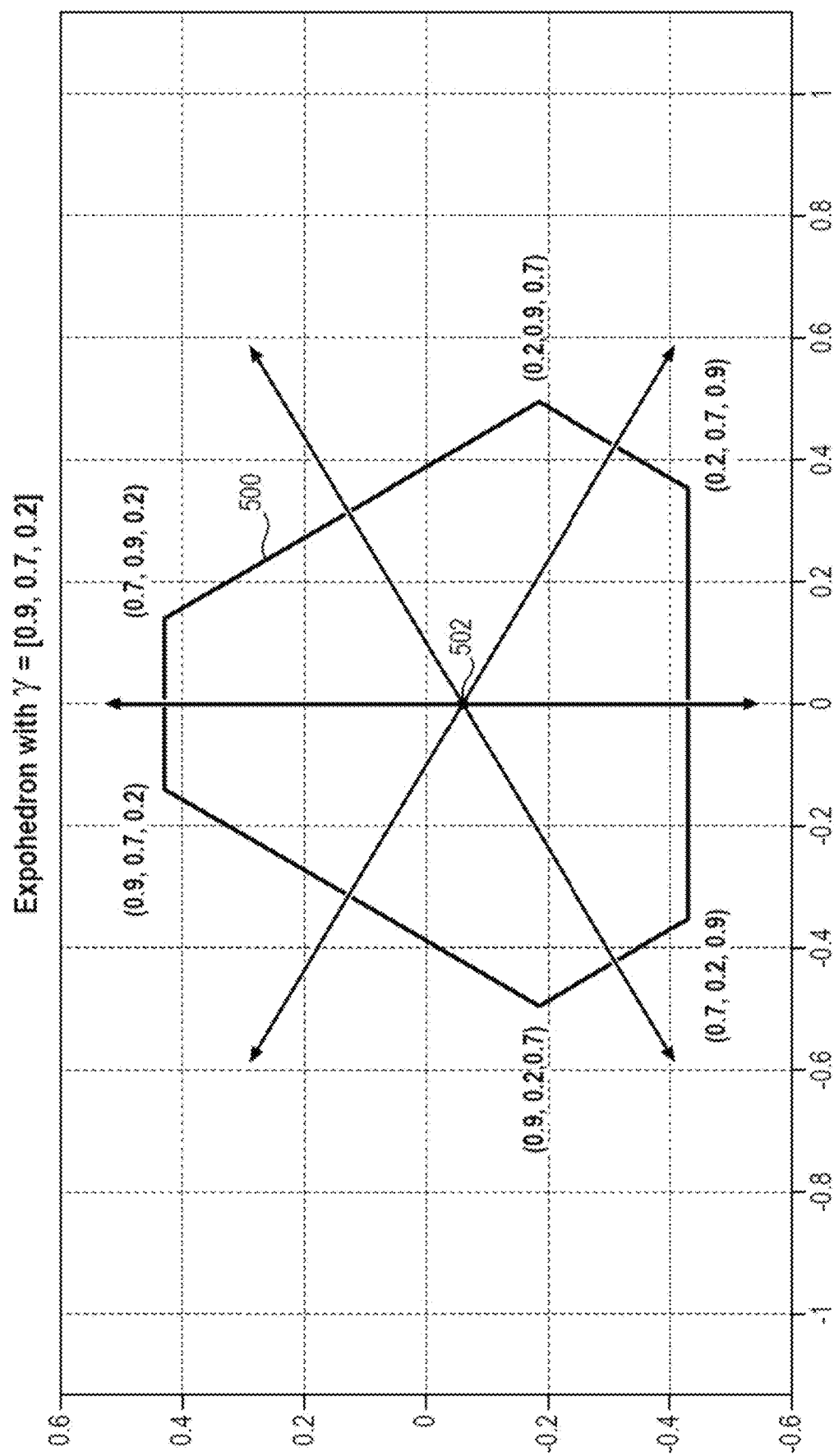
FIG. 5 illustrates an example generalized permutohedron (which is referred to in example methods as an Expohedron) for n=3, FIG. 6 sets out pseudo code of an example decomposition method that can be employed in some methods.

A particular example of an Expohedron for n=3 is shown in FIG. 5. Because the total sum of exposures is a constant in the example method, the example Expohedron lies on a plane embedded in a 3D-space. FIG. 5 represents the projection on that plane.

Any point in the Expohedron shown in FIG. 5 represents a particular exposure vector and this vector can be realized by a distribution of, maximum, three different permutations or rankings. The barycenter 502 of the hexagon 500 corresponds to equal exposure (i.e., demographic fairness) to each object (e.g., document), and can be realized as the uniform distribution over only three different rankings.

There is a straightforward mathematical way to check whether a point belongs to the Expohedron, and this way is exploited by example methods as explained herein. This is referred to as the majorization condition in mathematics, which provides that a point $\epsilon=(\epsilon_1, \ldots, \epsilon_n)$ belongs to the Expohedron if and only if $\epsilon$ is majorized by $\gamma$, which is written as: $\epsilon \prec \gamma$.

The mathematical definition of majorization is the following:

$$\epsilon \prec y \text{ if: } \sum_{i=1}^{k} \epsilon_i^{\downarrow} \leq \sum_{i=1}^{k} \gamma_i^{\downarrow} \forall k < n \text{ and } \sum_{i=1}^{n} \epsilon_i^{\downarrow} = \sum_{i=1}^{n} \gamma_i^{\downarrow}$$

with $x\downarrow$ the vector with the same components as x, but sorted in descending order.

Zones as used herein may be defined as sets of points that have coordinates (i.e., exposures) in the same order. More particularly, these points can correspond to vectors such that the indices of the components sorted in increasing order are the same. In Python, for example, it corresponds to arrays for which the outputs of the argsort function are identical. There are as many zones as vertices in the Expohedron, and each zone contains only one vertex. An example zone is an unbounded pyramid, whose apex is the barycenter and whose semi-axes correspond to the lines joining the Expohedron barycenter to the barycenter of each facet adjacent to the unique vertex that the zone contains.

Given a point in the Expohedron decision space, which has coordinates given by $\epsilon_{\pi(q)}$, an example method can include and/or consider the following, each of which is illustrated in further detail respectively in the sections that follow:

Define the Utility of a ranking policy $\pi(q)$ in this decision space;
Define different Fairness measures for ranking policies in this decision space;
Determine the Pareto-set (the set of non-dominated policies) corresponding to the Multi-Objective Optimization (MOO) problem, balancing Utility and Fairness;
Decompose a particular choice of a target exposure by the decision-maker on this Pareto-set as a distribution over at most n rankings; and
Deploy a distribution over at most n rankings with an efficient and effective scheduling strategy.

The example Utility criterion provides that objects with high relevance score or, more generally, with high gain should have a higher exposure. Without loss of generality, $\rho$ is defined as the vector of the gains (or relevance scores, if the gain function is chosen as the identity), normalized in the same units as the exposure vector, in the sense that $$\sum_{i=1}^{n} \rho_i = \sum_{i=1}^{n} \gamma_i,$$

which is a constant for a given PBM. This implies that $\rho$ is located on the same hyperplane as the exposure vectors and that they can be directly compared, composed, or visualized jointly on the projected Expohedron.

Figure 7:
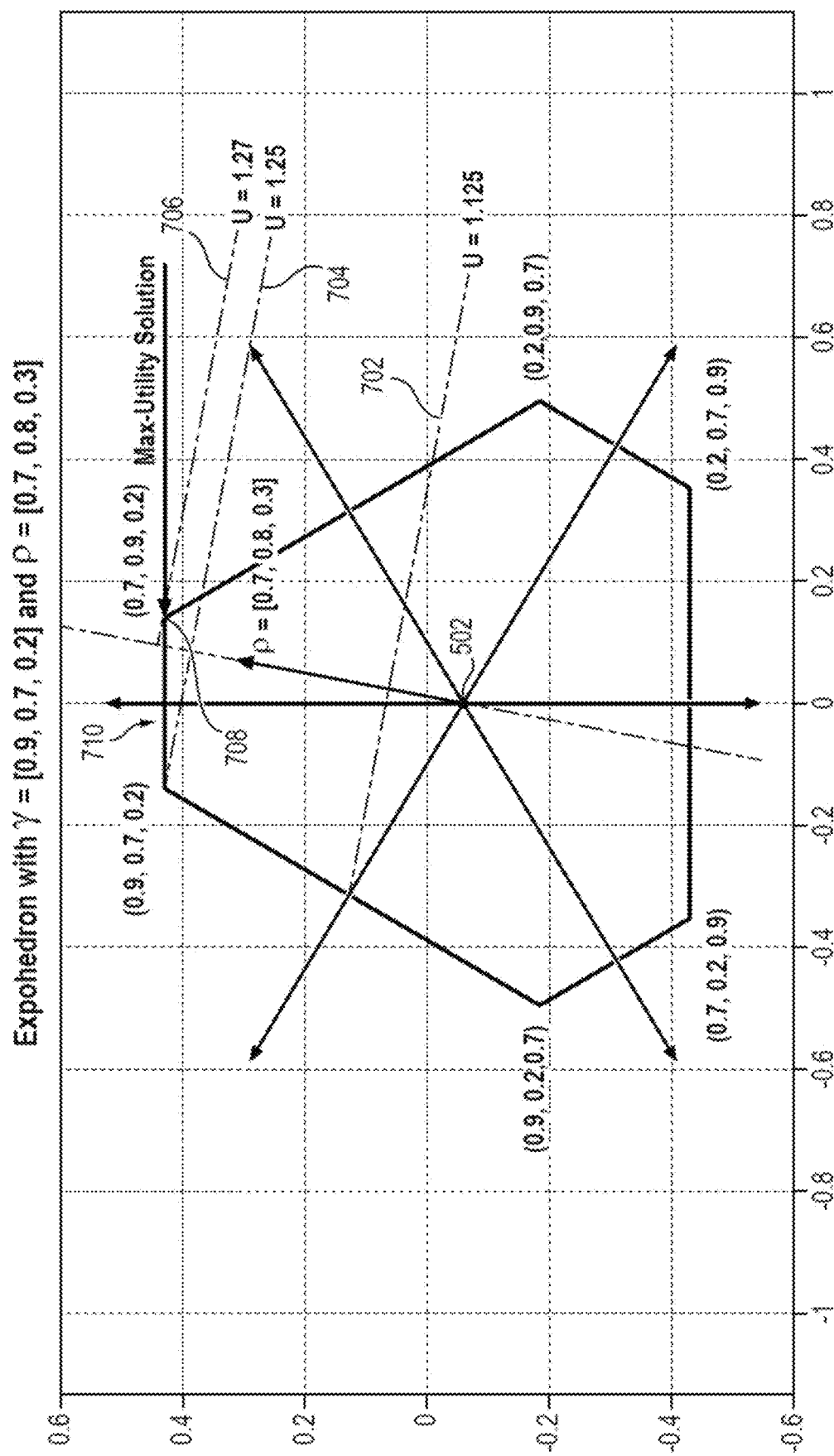
FIG. 7 illustrates equi-utility curves and max-utility solution in the Expohedron (n=3)

Utility may be expressed, for example, as the dot product between the relevance vector and the exposure vector: $U(\epsilon)=\rho^T \cdot \epsilon$. Consequently, equi-utility surfaces in the Expohedron are hyperplanes whose normal is equal to p, as illustrated in FIG. 7 for hyperplanes 702, 704, and 706. This definition of utility corresponds to the standard discounted cumulative gain (DCG) definition of utility in Information Retrieval for a particular choice of the gain function as $2^{relevance}$ and of the exposure parameters, namely:

$$\gamma_i = \frac{1}{\log_2(i+1)}.$$

Given this mathematical expression of the Utility, the max-Utility ranking policy in the Expohedron may be found using the point $\epsilon^*$ (or in some example methods the set of points) located on a face of the Expohedron whose projection on the $\rho$, i.e., $$\frac{(\epsilon^*)^T \cdot \rho}{\|\rho\|},$$

is the largest (see, for example, the point 708 on the face 710 in FIG. 7). It is not necessary to project all the points of the Expohedron to find this max-utility ranking: it is the vertex that is located in the same zone as p, which necessitates a single sorting operation. This is an equivalent formulation to the Probability Ranking Principle in Information Retrieval (see Stephen Robertson, "The Probability Ranking Principle in IR", in Journal of Documentation, 33:294-304, December 1977).

Figure 8:
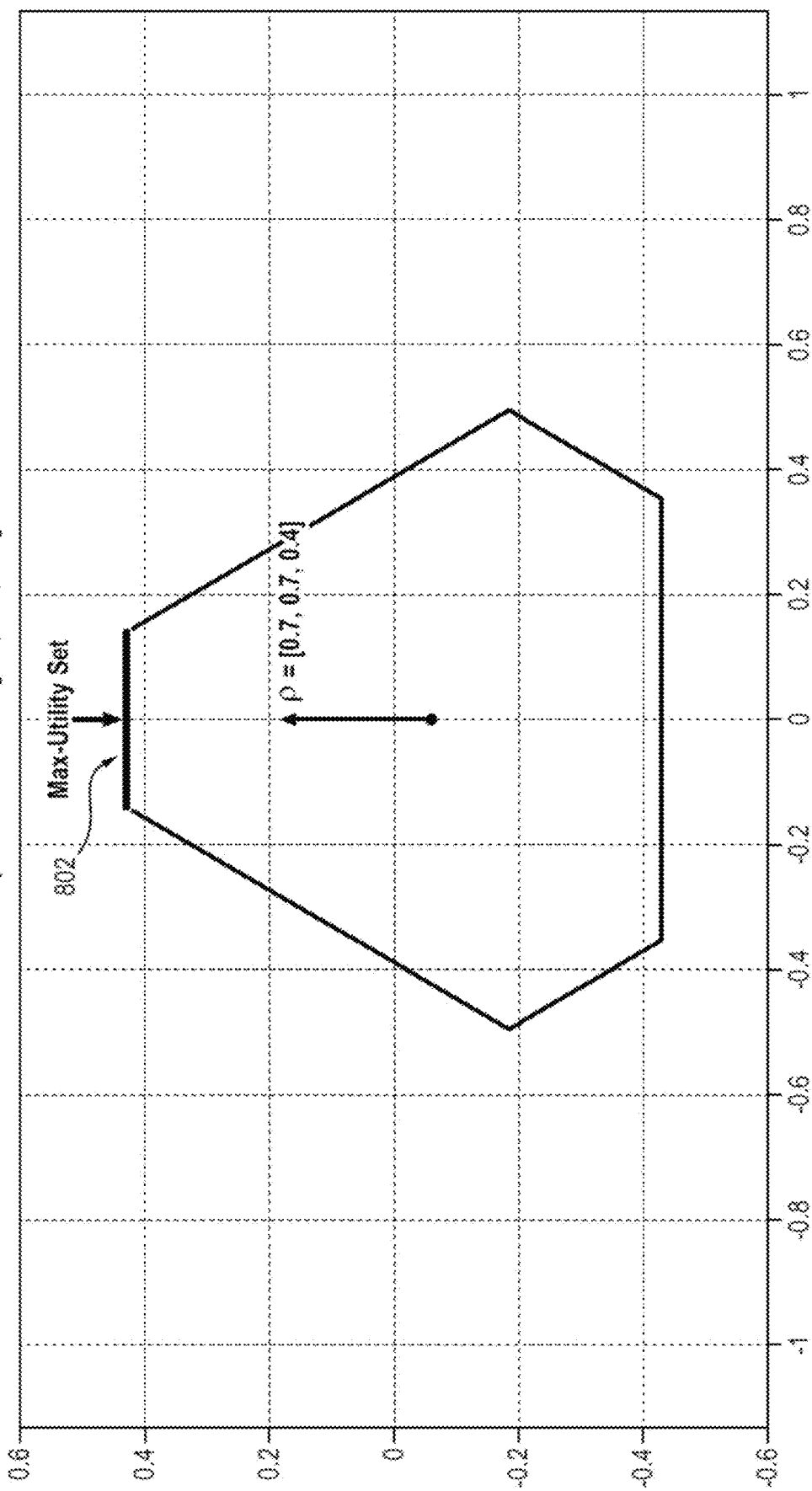
FIG. 8 illustrates max-utility solution in the Expohedron with relevance ties (n=3)

When the relevance vector has ties (i.e., where at least two elements of the relevance vector are equal), as represented on FIG. 8 with ties (as shown in the relevance vector <0.7,0.7,0.4>), the whole face 802 constitutes the set of max-Utility solutions.

An example fairness criterion will now be expressed in the Expohedron framework. The individual Demographic fairness criterion states that, ideally, all objects (e.g., documents) should have the same exposure. As the sum of the exposures is a constant, it means that the target exposure of the Demographic fairness policy is the barycenter of the Expohedron:

$$\beta = \left( \frac{\sum_{i=1}^{n} \gamma_i}{n}, \ldots, \frac{\sum_{i=1}^{n} \gamma_i}{n} \right).$$

Thus, the fairness criterion can be defined as a quadratic function, for instance as the proximity (or minus the distance) to the barycenter: $F_d(\epsilon) = -\|\epsilon - \beta\|_2^2$.

Considering now meritocratic fairness, an ideal exposure vector should be proportional to the relevance vector or, more generally, to the merit vector denoted as $\rho'$, where the merit of an object is defined as a monotonically increasing function of the relevance score of this object or, equivalently, of its gain (the proportionality constant is equal to one here, when working with a merit vector normalized in the same units as the exposure vector, in the sense that $$\sum_{i=1}^{n} \rho'_i = \sum_{i=1}^{n} \gamma_i \right).$$

$\rho$ and $\rho'$ are located in the same zone, because of the monotonically increasing relationship linking them. $\rho$ and $\rho'$ may be, but need not be, chosen as equal, and identical to the relevance score vector (i.e., the gain and merit functions are chosen as the identity function). Formally, the Meritocratic fairness of a policy with exposure $\epsilon$ can be defined as a quadratic function, for instance as the proximity (or minus the distance) to the normalized relevance vector: $F_m(\epsilon) = -\|\epsilon - \rho'\|_2^2$.

Figure 9:
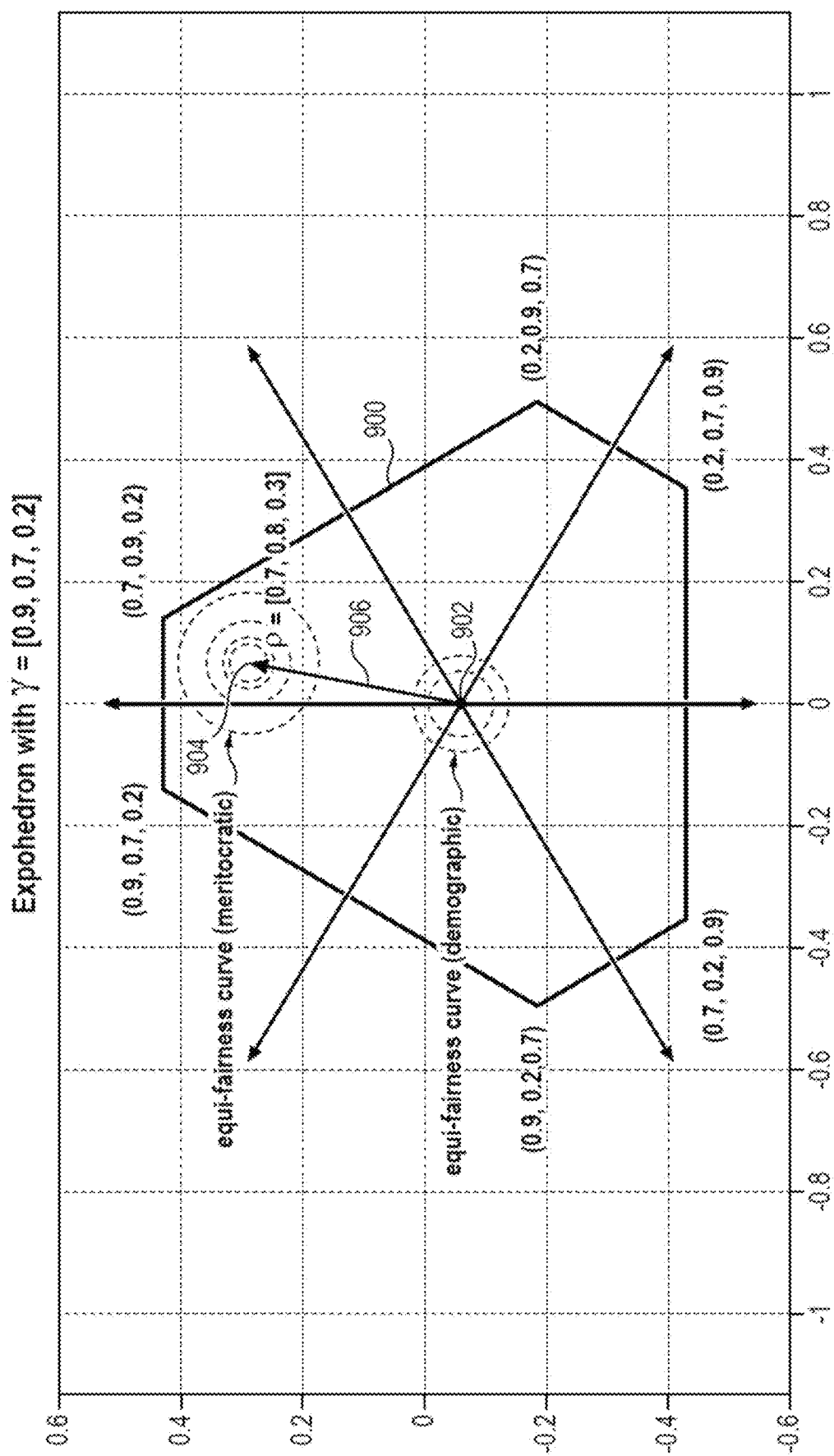
FIGS. 9 and 10 illustrate optimal demographic and meritocratic fairness solutions and equi-fairness curves in the Expohedron (n=3)

As illustrated in FIG. 9 where $\rho$ and $\rho'$ are chosen as equal, equi-fairness surfaces are hyper-spheres centered around $\beta$ or $\rho$, for demographic fairness 902 and Meritocratic fairness 904, respectively, in the Expohedron (n=3) 900, the optimal Demographic and Meritocratic fairness equi-fairness curves are the circles that surround the optimal fairness points 902 and 904, respectively, where the vector 906 is the relevance vector.

It could happen that the merit vector is outside the Expohedron, namely when $\gamma \nsucc \rho'$ (i.e., the majorization condition is not fulfilled). In this case, it is possible to relax the pure proportionality relationship into an affine relationship, with an offset as small as possible while still being in the Expohedron (e.g., the definition of fairness as expressed in Biega et al., "Overview of the TREC 2019 Fair Ranking Track", in arXiv:2003.11650, March 2020, and in Diaz et al., "Evaluating Stochastic Rankings with Expected Exposure", in Proceedings of the 29th ACM International Conference on Information & Knowledge Management, pages 275-284, October 2020). This amounts to choosing a target vector which is at the intersection of the merit vector axis and the border of the Expohedron.

Figure 10:
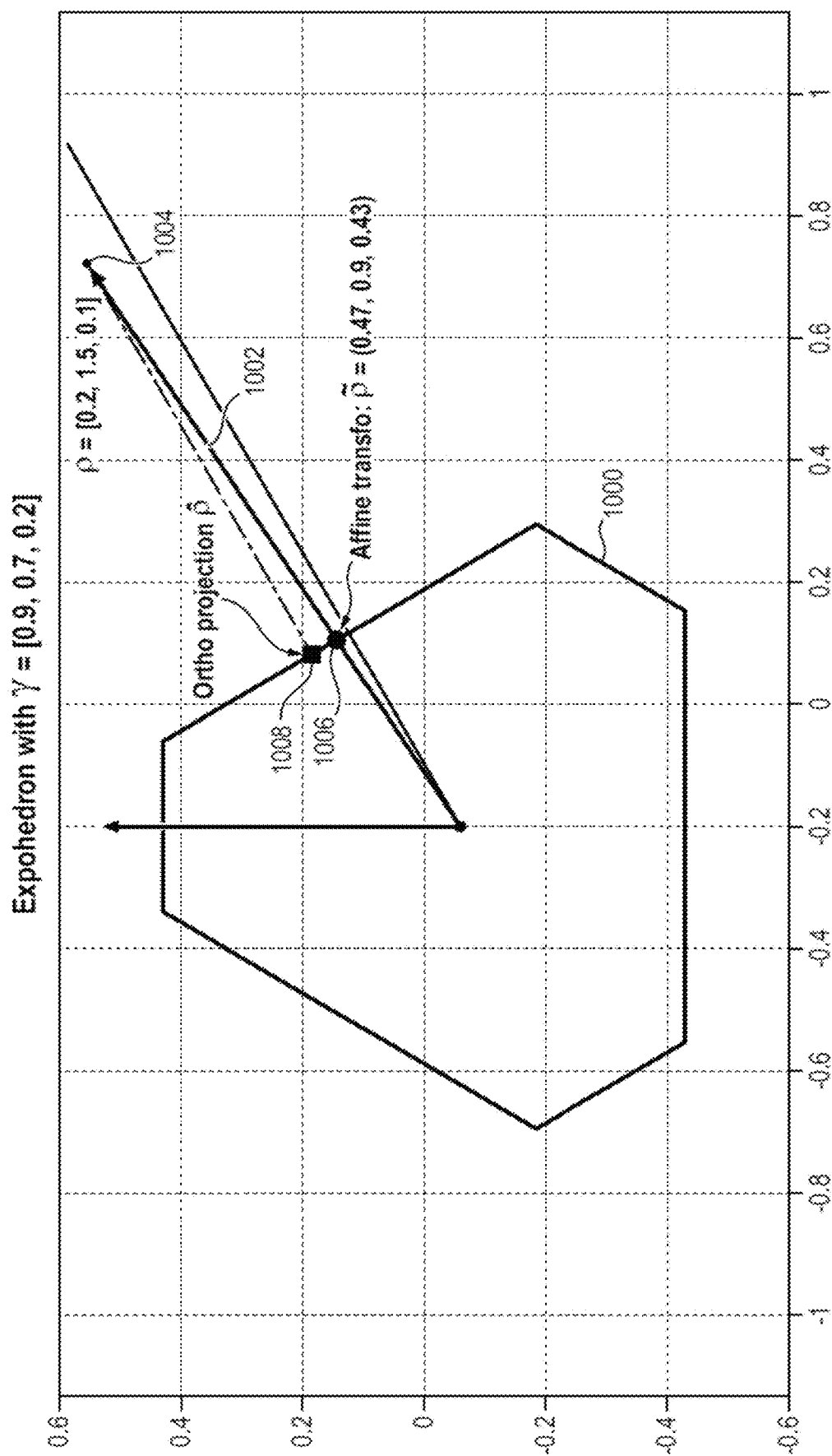

FIG. 10 shows an example in which the optimal point 1004 identified by the merit vector 1002 is unfeasible because it is outside the Expohedron 1000. This new feasible target vector is indicated at point 1006. This can be computed as follows. Denote $$G_k = \sum_{i=1}^{k} \gamma_i \text{ and } R_k = \sum_{i=1}^{k} \rho'^{\downarrow}_i.$$

The intersection of the relevance vector axis and the border of the Expohedron is given by the affine transformation (referred to in FIG. 10 as "Affine transform") of the normalised merits $\tilde{\rho}_i = \alpha \rho'_i + b$, with:

$$b = G_n \max_{k=1,2,\ldots,n-1} \frac{\frac{G_k}{G_n} - \frac{R_k}{R_n}}{k - n\frac{R_k}{R}},$$

which expresses that $$\sum_{i=1}^{k} \tilde{\rho}_i \leq \sum_{i=1}^{k} \gamma_i,$$

and that b is the smallest value that ensures that condition $\forall k < n$; and $$a = \frac{G_n - nb}{R_n},$$

which expresses that $$\sum_{i=1}^{n} \tilde{\rho}_i = \sum_{i=1}^{n} \gamma_i.$$

An alternative solution to the affine transformation for choosing an alternative but feasible meritocratic fairness point is to compute an orthogonal projection, for which a result for the example shown in FIG. 10 is indicated at point 1008.

Having determined how to compute and how to optimize the utility and fairness separately, the complete Pareto-set of the multi-objective utility-fairness problem can be computed.

Explaining the method intuitively and geometrically, an example computation method starts from one extreme of the Pareto-set, namely a purely fair solution. Then, to draw (e.g., compute) the entire Pareto-set, the gain vector direction is (computationally) followed. It may be shown that all these points are not dominated by any other point in the Expohedron and correspond to some optimal trade-off between fairness and utility. If the gain vector direction is always followed, the border of the Expohedron will necessarily be crossed at a certain point, which means that the solution is no longer feasible. The direction of the gain vector projected on the (n−2)-dimensional facet that was just crossed is then (computationally) followed. By following this new direction, a new face is crossed, which is this time (n−3)-dimensional, and, once again, the direction of the gain vector projected on that new face is. Finding the projection of the gain vector of any face has a closed-form expression. This path-following procedure is re-iterated computationally until finally a non-dominated max-utility solution is reached. Along that path, every point corresponds to a strongly non-dominated solution of the utility-fairness trade-off, in other words, the path is a Pareto-set.

Figure 11:
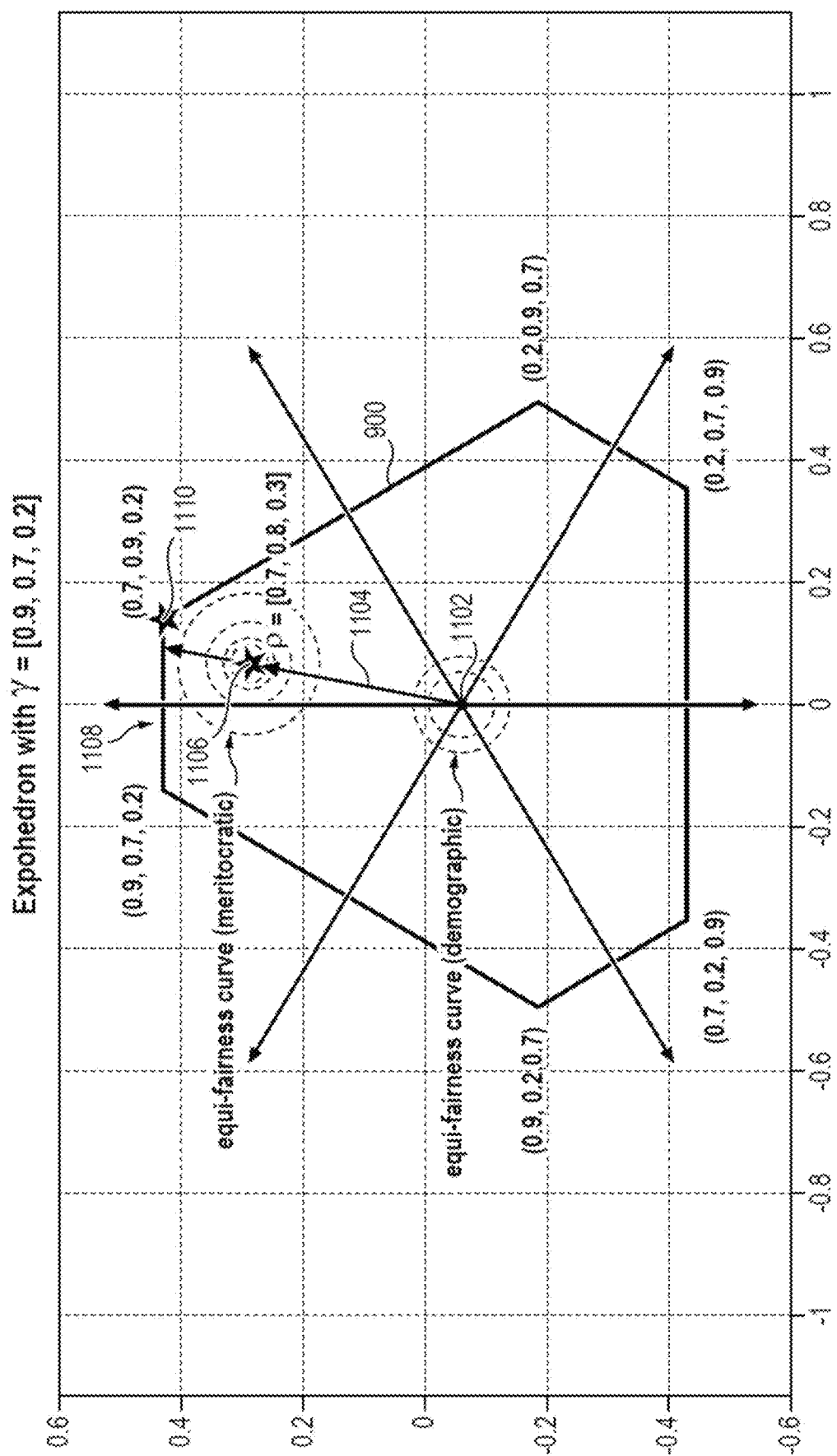
FIG. 11 illustrates a Pareto-set in the Expohedron (n=3)

The path-following procedure described above is illustrated in FIG. 11 for n=3 and for gain and merit functions chosen as the identity (i.e., the merit and the gain of a document are identical to its relevance score). The Pareto-set is defined from 1102 to 1110 if the demographic fairness criterion is used, and from 1106 to 1110 if the meritocratic fairness criterion is used. The Pareto-set starts from the barycenter 1102 on the graph (if the demographic fairness criterion is used), and the direction of the line segment 1104 (which is the gain vector axis) is followed, which goes through the meritocratic fairness point 1106 on the graph, intersects the edge 1108, or the facet, that corresponds to mixing rankings where objects (e.g., documents) $d_1$ and $d_2$ are permuted in the first two ranks and then this facet is followed until the max-Utility solution is reached, represented as the star 1110 on the graph. If the meritocratic fairness criterion were used, the Pareto-set would start at point 1106.

More formally described, the Pareto-optimal set is the union of (n−1) line segments that connects $v^{(i-1)}$ to $v^{(i)}$, for i=1, . . . , (n−1). In the following, without loss of generality and for the sake of notation simplicity, it is assumed that the objects (e.g., documents) are sorted by decreasing order of gain, namely $\rho=(\rho_1, \rho_2, \ldots, \rho_n)$ with $\rho_1 \geq \rho_2 \geq \ldots \geq \rho_n$. The initial point $v^{(0)}$ is either β or ρ' (replaced by ρ̄ if ρ' is infeasible), depending on whether demographic or meritocratic fairness are considered. When establishing the Pareto-set, the points are always located in the same zone (i.e., the zone of the max-Utility or PRP vertex; it is noted that the barycenter belongs to all zones, as all zones have the barycenter as apex) because, the order of the components of the corresponding exposure vectors is not changed when a vector in the direction of the gain vector is incrementally added to these exposure vectors, even if it is projected on a face.

An embodiment of the Pareto-set building method is set out in FIG. 12 in pseudo code. More specifically, FIG. 12 sets forth pseudo code for Pareto-set identification, which assumes (without loss of generality) that the gain vector ρ, the vector γ of PBM parameters associated to each rank, and the initial point $v^{(0)}$ are in an ordered preserving zone where the values are ordered from greatest to least great.

As set forth herein, a point in the Pareto-set, which can be chosen for instance by a decision-maker, can translate to a target exposure within the decision space. This point in the Pareto-set can be decomposed as a convex combination of at most n rankings. To begin this decomposition problem, example methods can particularize and adapt the general GLS procedure described above to the structure of the Expohedron polytope.

One embodiment for realizing the decomposition is set forth in pseudo-code in FIG. 6. The decomposition method in FIG. 6 exploits the fact that, once a point is on a facet (or a face of lower dimension), a vertex on this facet (or face) may be found by choosing the vertex of the zone in which the point is located, which can be done by sorting the components of the point (see line 5 in FIG. 6). Note that this step has O(n log n) complexity.

At line 9 in FIG. 6, the example method finds the point which extends the $v^{(i)} \rightarrow x^{(i)}$ line segment until it reaches a facet (i.e., a face): this intersection point ($x^{(i+1)}$) defines the new point to be decomposed recursively. At each iteration in the loop, the new point ($x^{(i+1)}$) is on a face of dimension (n−i), meaning that the final point will always be a vertex (dimension=0). As finding the intersection is equivalent to finding the root of the majorization condition (i.e., the point where the condition value goes from True to False), at line 9 in FIG. 6 the Bisection method (i.e., a numerical method that find a root of a given function) is applied, using the majorization criterion to detect when the method should stop. In addition, the majorization criterion may be exploited to find an efficient upper end-point on the intersection with the face A (where efficient upper end-point is used herein to mean "not too far away from the true intersection"). The computation of this endpoint is performed at lines 6-8 in FIG. 6.

The bisection method itself has a number of iterations that is independent of n (e.g., for 5-10 iterations). Checking the majorization condition inside the Bisection method requires O(n log n) complexity, so that the total complexity of this method is O($n^2$ log n).

Given the decomposition of the target exposure into a distribution over ranking, any of several methods, alone or in combination, may be used to deploy the distribution in the form of a sequence of rankings.

For example, stochastic sampling (i.e., random number generators) may be used to deploy a distribution over rankings. In other embodiments, Low-Discrepancy Sequences may be used (e.g., see Martin Roberts, "The unreasonable effectiveness of quasirandom sequences", April 2018).

Low-Discrepancy Sequences (LDS) are provided such that for all t, the sub-sequence of rankings $R_1, R_2, \ldots, R_t$ has low discrepancy (i.e., the proportion of rankings is close to the desired proportion; i.e., proportion of the infinite sequence). Low-Discrepancy Sequences are typically quasi-random sequences of numbers in the [0,1] interval that are as close as possible to the uniform distribution, and these sequences of floats in [0,1] may be transformed as sequences of rankings with desired proportion by comparing the generated float with the stacked (i.e., cumulated) value of the proportions.

The use of additive-recurrence sequence based on irrational numbers (also called Kronecker, Weyl or Richtmyer sequences) may be used in embodiments, and in particular on the golden ratio, which is in some sense the most irrational number. The general recursive form of the sequence is:

$$s_{n+1} = (s_n + \alpha) \bmod 1$$

with $\alpha = (\sqrt{5}-1)/2$, which is the value achieving the optimal discrepancy for this additive-recurrence sequence class of LDS.

Families of efficient sampling strategies other than Low Discrepancy Sequences may alternative or additionally be used. For instance, strategies based on Stride Scheduling or, equivalently, m-balanced words, can be used as well, and can provide very similar performance.

When expressed in the terms of the example problem, a generator of m-balanced words produces a sequence of rankings such that, in any pair of sub-sequences with identical length, the frequency of any ranking differs at most by m. In other words, this generator guarantees that the generated sequence delivers the rankings with proportions as close as possible to the target ones. In theory, but not wishing to be bound by theory, the best achievable m is, in an example case, at most equal to n−1. An example algorithm capable of efficiently generating m-balanced sequences of rankings, given a certain distribution of distribution of rankings, is provided in Algorithm 1 of Shinya Sano, Naoto Miyoshi, and Ryohei Kataoka. 2004. m-Balanced words: A generalization of balanced words. Theoretical Computer Science 314, 1-2 (February 2004), 97-120. https://doi.org/10.1016/j.tcs.2003.11.21. This generator is equivalent to the Stride Scheduling algorithm, used to generate fair sequences in resource (CPU) management for concurrent processes, as described, for instance, in C. A. Waldspurger and E. Weihl. W. 1995. Stride Scheduling: Deterministic Proportional- Share Resource Management. Technical Report. Massachusetts Institute of Technology, USA.

Example methods set forth for ranking objects may be provided as a computer program product comprising code instructions to execute these methods (for example using data processors 112 of the server 100 and the computing devices 120), and storage means readable by computer equipment (for example using memory 113 of the server 100 and the computing devices 120) provided with this computer program product for storing such code instructions.

The example methods include the following aspects:
- the set of objective functions may include a quadratic function and a linear function;
- the quadratic function may be a fairness function and the linear function may be a utility function;
- the fairness function may be a normalized difference, such as squared L2-norm of the difference, between a vector made up of the decision variables and a target vector;
- the method may further include receiving a relevance score for each object in the set, a list of exposures provided to the objects in the set which are each associated with a rank, a ranking fairness objective function and a ranking utility objective function;
- determining the Pareto-set for the set of objective functions may include computing the Pareto-set within the decision space considering the ranking fairness objective function and the ranking utility objective function, and where determining the distribution over rankings for the objects in the set using the decision space may include receiving a specified point in the Pareto-set which translates to a target exposure across the objects in the set within the decision space, and, using the target exposure, determining a distribution over rankings which achieve on average the target exposure for the objects in the set, each ranking of the distribution over rankings corresponding to a vertex in the decision space;
- the determining the distribution over rankings for the objects in the set using the decision space may further include for the number of objects in the set:
  - (i) determining an arbitrary vertex of the decision space;
  - (ii) drawing a line starting at the arbitrary vertex through the target exposure until the line intersects a face of the decision space;
  - (iii) repeating (i) and (ii) on the intersected face of the decision space using the new intersection point instead of the target exposure, until the newly intersected face is a vertex;
- the fairness function may be based on Meritocratic fairness or Demographic fairness;
- determining the distribution over rankings for the objects in the set using the decision space may use a Grötschel, Lovász and Schrijver (GLS) procedure;
- selecting a sequence of rankings for the objects in the set may include one or more of stochastic sampling, Low-Discrepancy Sequences, additive-recurrence sequences, Stride Scheduling, or m-balancing;
- the objects in the set may include a plurality of queries;
- the objects in the set may be identified in response to a query;
- the objects in the set may include a plurality of recommendations;
- the objects in the set may be identified in response to a map location;
- outputting may include providing for display on a display of a device at least a subset of the set of objects, ranked according to the selected sequence of rankings; and
- the at least a subset of the set of objects may be provided on a Search Engine Result Page.

When delivering a ranked list of results in response to a search query, the search system may naturally give more exposure to highly ranked results than to lower ranked results. For example, results may be ordered by decreasing relevance with respect to a query. This, however, may be unfair to producers (e.g., of items that can be provided as results). For example, with many results almost equally relevant, items with similar relevance are given different amounts of exposure. Amortization can be used to help deal with the above referenced unfairness. Amortization involves delivering different rankings in order to adjust utility and fairness to target values.

In an embodiment, the present application involves a system that computes a distribution regarding results offline for a Dynamic Bayesian Network (DBN) exposure model. The system finds a Pareto-optimal distribution for a utility objective and a fairness objective using at most as many rankings as there are items to rank. The DBN exposure model takes into account relevance scores that could be used to order items in descending order of relevance.

While the following will be discussed in the context of providing search results in response to a query, this embodiment of the present application is also applicable to providing results and an order for providing the results, such as recommendation systems that recommend items (e.g., songs, documents, etc.) and other types of systems.

FIG. 13 includes a functional block diagram including a search system 1302 configured to respond to queries. The search system 1302 is configured to receive queries from one or more user computing device(s) 104 via a network 1306. The queries may be, for example, text input to a computing device, audio input to a computing device, or input received in one or more other manners.

The search system 1302 performs searches based on the queries, respectively, to identify one or more search results. The search system 1302 transmits the results back to the computing devices 1304 that transmitted the queries, respectively. For example, the search system 1302 may receive queries regarding a subject, such as a business, a point of interest, a product, etc. The search system 1302 may provide results indicative of information regarding subjects to the computing devices 1304.

The computing devices 1304 output the results to users. For example, the computing devices 1304 may display the results to users on one or more displays of the computing devices and/or one or more displays connected to the computing devices. Additionally or alternatively, the computing devices 1304 may audibly output the results via one or more speakers. The computing devices 1304 may also output other information to the users. For example, the computing devices 1304 may output additional information related to the results, advertisements related to the results, and/or other information. The search system 1302 and the computing devices 1304 communicate via a network 1306.

A plurality of different types of computing devices 1304 are illustrated in FIG. 1. An individual user computing device may also be referred to herein as a computing device 1304. The computing devices 1304 include any type of computing devices that is configured to generate and transmit queries to the search system 1302 via the network 1306. Examples of the computing devices 1304 include, but are not limited to, smart (cellular) phones, tablet computers, laptop computers, and desktop computers, as illustrated in FIG. 1. The computing devices 1304 may also include other computing devices having other form factors, such as computing devices included in vehicles, gaming devices, televisions, consoles (e.g., smart speakers without displays Amazon Echo, Google Home, Clova Friends mini) or other appliances (e.g., networked refrigerators, networked thermostats, etc.).

The computing devices 1304 may use a variety of different operating systems. In an example where a computing device 1304 is a mobile device, the computing device 1304 may run an operating system including, but not limited to, Android, iOS developed by Apple Inc., or Windows Phone developed by Microsoft Corporation. In an example where a computing device 1304 is a laptop or desktop device, the computing device 1304 may run an operating system including, but not limited to, Microsoft Windows, Mac OS, or Linux. The computing devices 1304 may also access the search system 1302 while running operating systems other than those operating systems described above, whether presently available or developed in the future.

In some examples, a computing device 1304 may communicate with the search system 1302 using an application installed on the computing device 1304. In general, a computing device 1304 may communicate with the search system 1302 using any application that can transmit queries to the search system 1302 to be responded to (with results) by the search system 1302. In some examples, a computing device 1304 may run an application that is dedicated to interfacing with the search system 1302, such as an application dedicated to performing searching and providing search results. In some examples, a computing device 1304 may communicate with the search system 1302 using a more general application, such as a web-browser application. The application executed by a computing device 1304 to communicate with the search system 1302 may display a search field on a graphical user interface (GUI) in which the user may input queries. The user may input a query, for example, by adding text to a text field using a touchscreen or physical keyboard, a speech-to-text program, or other form of user input.

A text query entered into a GUI on a computing device 1304 may include words, numbers, letters, punctuation marks, and/or symbols. In general, a query may be a request for information identification and retrieval from the search system 1302. For example, a query including text may be directed to providing information regarding a subject (e.g., a business, point of interest, product, etc.) of the text of the query.

A computing device 1304 may receive results from the search system 1302 that is responsive to the search query transmitted to the search system 1302. In various implementations, the computing device 1304 may receive and the search system 1302 may transmit multiple results that are responsive to the search query or multiple items (e.g., entities) identified in a query. In the example of the search system 1302 providing multiple results, the search system 1302 may determine a confidence value for each of the results and provide the confidence values along with the results to the computing device 1304. The computing device 1304 may display more than one of the multiple results (e.g., all results having a confidence value that is greater than a predetermined value), only the result with the highest confidence value, the results having the N highest confidence values (where N is an integer greater than one), etc. As discussed further below, the search system 1302 generates the confidence values to provide a tradeoff between utility and fairness.

The computing device 1304 may be running an application including a GUI that displays the result(s) received from the search system 1302. The respective confidence value(s) may also be displayed, or the results may be displayed in order (e.g., descending) based on the confidence values. For example, the application used to transmit the query to the search system 1302 may also present (e.g., display or speak) the received search results(s) to the user via the computing device 1304. As described above, the application that presents the received result(s) to the user may be dedicated to interfacing with the search system 1302 in some examples. In other examples, the application may be a more general application, such as a web-browser application.

The GUI of the application running on the computing device 1304 may display the search result(s) to the user in a variety of different ways, depending on what information is transmitted to the computing device 1304. In examples where the results include a list of results and associated confidence values, the search system 1302 may transmit the list of results and respective confidence values to the computing device 1304. In this example, the GUI may display the result(s) and the confidence value(s) to the user as a list of possible results.

In some examples, the search system 1302, or another computing system, may transmit additional information to the computing device 1304 such as, but not limited to, applications and/or other information associated with the results, the query, points of interest associated with the results, etc. This additional information may be stored in a data store and transmitted by the search system 1302 to the computing device 1304 in some examples. In examples where the computing device 1304 receives the additional information, the GUI may display the additional information along with the result(s). In some examples, the GUI may display the results as a list ordered from the top of the screen to the bottom of the screen by descending confidence value. In some examples, the results may be displayed under the search field in which the user entered the query.

In some examples, the computing devices 1304 may communicate with the search system 1302 via another computing system. The other computing system may include a computing system of a third party using the search functionality of the search system 1302. The other computing system may belong to a company or organization other than that which operates the search system 1302. Example parties which may leverage the functionality of the search system 1302 may include, but are not limited to, internet search providers and wireless communications service providers. The computing devices 1304 may send queries to the search system 1302 via the other computing system. The computing devices 1304 may also receive results from the search system 1302 via the other computing system. The other computing system may provide a user interface to the computing devices 1304 in some examples and/or modify the user experience provided on the computing devices 1304.

The computing devices 1304 and the search system 1302 may be in communication with one another via the network 1306. The network 1306 may include various types of networks, such as a wide area network (WAN) and/or the Internet. Although the network 1306 may represent a long range network (e.g., Internet or WAN), in some implementations, the network 1306 may include a shorter range network, such as a local area network (LAN). In one embodiment, the network 1306 uses standard communications technologies and/or protocols. Thus, the network 1306 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 1306 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1306 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 1306 can use custom and/or dedicated data communications technologies instead of, or in addition to, the ones described above.

Figure 14:
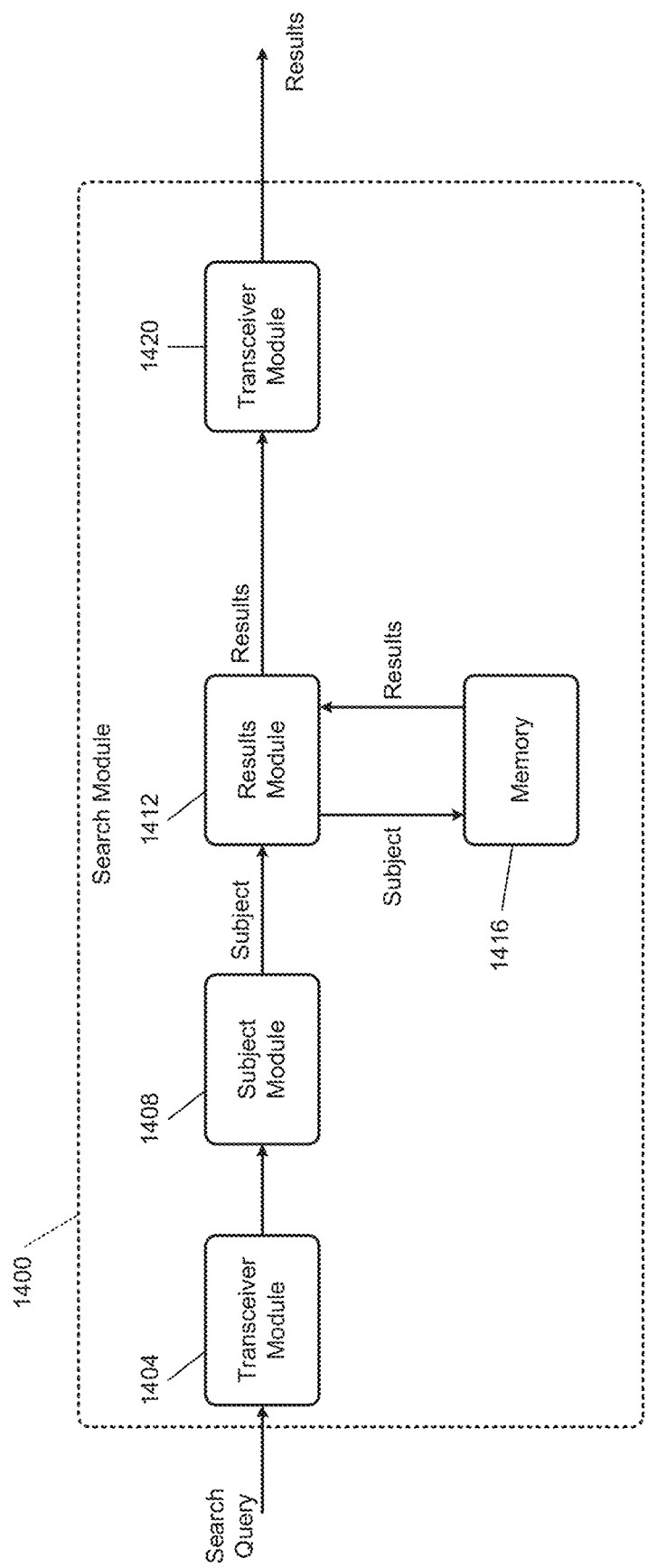
FIG. 14 is a functional block diagram including an example implementation of a search module of the search system.

FIG. 14 is a functional block diagram including an example implementation of a search module 1400 of the search system 1302. A first transceiver module 1404 receives a query from a computing device 1304. A subject module 1408 parses the query and may determine a subject of the query. As an example, the subject may be a business, a product, a point of interest, etc.

A results module 1412 determines results regarding the query, such as from memory 1416. The results module 1412 also determines the confidence values for the results, respectively. A second transceiver module 1420 transmits the determined results for the query back to the computing device 1304 via the network 1306. In various implementations, the second transceiver module 1420 may be omitted, and the first transceiver module 1404 may transmit the results back to the computing device 1304 from which the query was received. As discussed further below, the results module 1412 determines the confidence values to provide a tradeoff between (a) utility to consumers of information and (b) fairness to producers of information.

Figure 15:
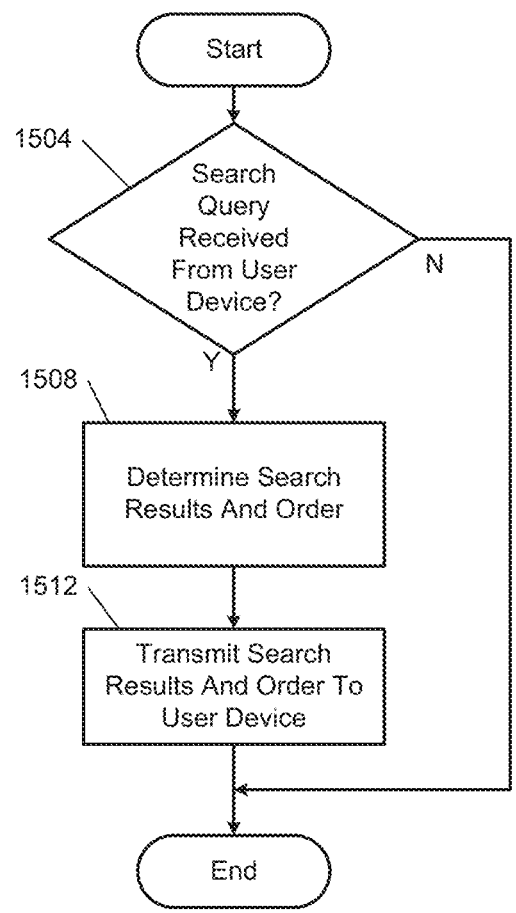
FIG. 15 includes a flowchart depicting an example method of receiving a query regarding a subject and providing search results and an order.

FIG. 15 includes a flowchart depicting an example method of receiving a query and providing results in response to the query. The example of FIG. 15 may be performed by the search module 1400. Control begins with 1504 where the search module 1400 receives a query from a computing device 1304.

At 1508, the results module 1412 determines search results and an order (e.g., confidence values). The results module 1412 may also retrieve other information associated with the query. At 1512, the search module 1400 transmits the search results and the confidence values to the computing device 1304 from which the query was received. The computing device 1304 outputs the received search results, such as visually via a display and/or audibly via a speaker. While the example of FIG. 15 is illustrated as ending, control may return to 1504. Multiple instances of the example of FIG. 15 may be performed simultaneously.

Figure 16:
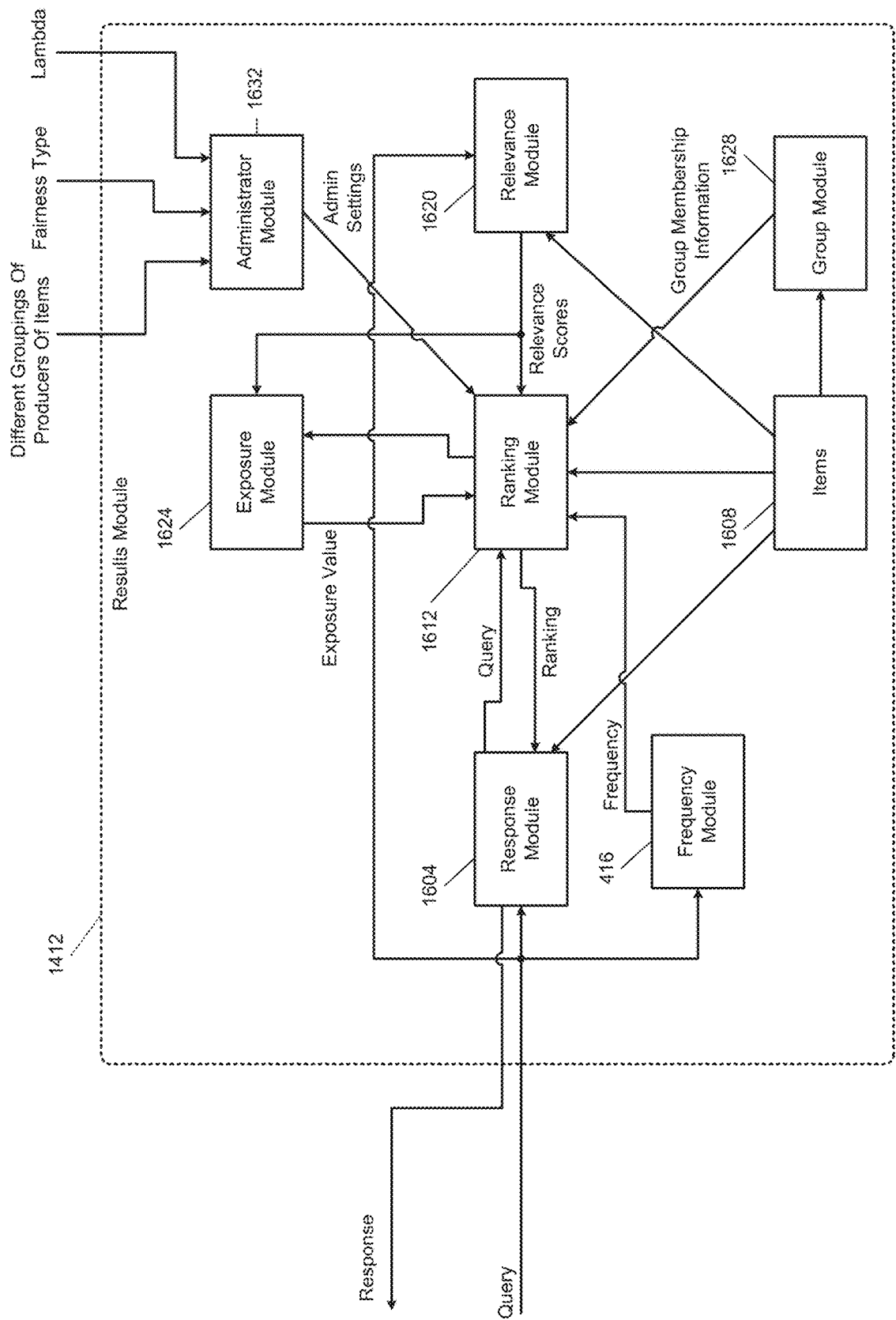
FIG. 16 is a functional block diagram of an example of a results module.

FIG. 16 is a functional block diagram of an example of the results module 1412. A response module 1604 receives a query and determines a response to the query. The response includes a ranked list of entities 1608 associated with the query to be output via a computing device that transmitted the query. The entities 1608 may be webpages, songs, or another form of consumable item that is available via the Internet.

A ranking module 1612 sets the rankings of the entities in the ranked list based on a frequency of the query (e.g., a subject of the query), relevance scores for the entities 1608, respectively, and an exposure value. A frequency module 416 receives each query and determines frequencies of queries. The frequency of a query may indicate how frequently queries for a subject are received from all computing devices generally. The frequency module 416 may determine the frequencies of queries, for example, using counters. A relevance module 1620 provides the relevance (utility) values of the entities 1608, respectively, for the query.

An exposure module 1624 determines the exposure value for the query based on the relevance scores and one or more other parameters, as discussed further below. The exposure module 1624 sets the exposure value to provide a tradeoff between utility of the entities 1608 and fairness to producers of the entities 1608. The exposure value may refer to a point on a surface of an Expohedron that provides a desired balance between fairness and utility of entities. Based on the exposure value, the ranking module 1612 determines the ranking for the query. The exposure module 1624 varies the exposure value over time even for the same query received from different computing devices such that different ranked lists of the items are provided to different computing devices. For example, the ranking module 1612 may determine the ranking using one or more models that relate relevance scores, query frequencies, and exposure values to ranking (lists).

In an embodiment, the ranking module 1612 generates the exposure value using a Dynamic Bayesian Network (DBN) model that generates the surface, which may be referred to as a DBN-Expohedron. Unlike the surfaces generated using PBM model in an alternate embodiment, surfaces generated using the DBN model vary based on the relevance scores (vector) for a query even when ranking the same number of items. By way of contrast, the PBM model generates the same surface (regardless of relevance and the query) when ranking the same number of items. Also, the surfaces generated using the DBN model are asymmetrical, while the surfaces generated using the PBM model are symmetrical, such as illustrated in FIGS. 3, 5, and 7. For example, FIG. 17 includes example surfaces generated by the DBN model based on 2 (left), 3 (middle), and 4 (right) items given different relevance vectors.

In various implementations, a group module 1628 may provide group membership information, such as gender, hair color, preference, and/or other user attributes. The ranking module 1612 may determine the ranking for items for the query further based on the group membership information.

An administrator module 1632 provides administrator settings. The ranking module 1612 may determine the ranking for the query based on one or more of the administrator settings. For example, the administrator settings may include, for example, groupings (e.g., by subject) of the items 1608, a fairness type to use to generate the ranking, and a lambda value.

Consider the following scenario: given a query q associated to a set of n items (e.g., documents). Ranked lists of these n items are returned sequentially in response to different queries in a manner that is useful to the recipients of the rankings and fair to the producers of the items after a predetermined number of delivered rankings. Queries are repeated and amortization is done on each query independently. In other words, ranking for responding to a second query q2 are not set to compensate for unfairness in rankings used to respond to a first query q1. The true relevance scores of the n items with respect to the query q are binary and may be unknown. Provided are probabilities for each item that are relevant in response to a query. Users (of computer devices transmitting the queries) may assumed to be the same and anonymous to increase fairness at the user/consumer side.

Herein, $\bullet^T$ may denote the transpose operator and $\|\bullet\|_2^2$ may denote the square isotropic 2-norm. $\|\bullet\|_1$ may denote the 1-norm. The bar $\bar{\bullet}$ may be used to denote the average value of the components of a vector e.g., $\bar{x}$. lcm($\bullet$, $\bullet$) may be used to denote the least common multiple of two integers. The expectation of a random variable may be denoted by $\mathbb{E}[\bullet]$ and the variance may be denoted by $\mathbb{V}[\bullet]$. The convex hull may be denoted by Conv($\bullet$). The terms document and item may be used interchangeably.

Rankings may be expressed as permutations. A permutation or ranking $\pi$ of size n may be a bijection on $\{1, \ldots, n\}$. $S_n$ may be the set of all permutations size n. $\pi$ may be a function that maps a rank k to an item $\pi(k)$ and not the item to its rank. A subset of rankings may be defined that satisfy the Probability Ranking Principle (PRP). Regarding such a subset, given a vector of relevance probabilities $\rho \in [0, 1]^n$, the subset PRP($\rho$)$\subseteq S_n$ of PRP rankings may be the set of $\pi \in S_n$ such that $\rho_{\pi(1)} \geq \ldots \geq \rho_{\pi(n)}$.

The exposure of an item may be considered to be the probability of the user examining the item, which may also be referred to as attention probability or examination probability. The exposure module 1624 uses a Dynamic Bayesian Network (DBN) exposure model, defined as follows.

Dynamic Bayesian Network (DBN) Exposure Model

Unlike the PBM based exposure model, the exposures generated by the DBN are based on the relevances of the items ranked making the DBN a more realistic model. The DBN model generates the exposure value based on a continuation probability (value) and a satisfaction probability value. $\gamma \in [0,1]$ may be the continuation probability of a user continuing his or her search past an item, and $k \in [0,1]$ may be the satisfaction probability value of an item satisfying the user for the query. The DBN model generates the exposure value further based on the relevance vector $\rho \in \mathbb{R}^1$.

Ranking may be expressed as a permutation $\pi \in S_n$, of n items such that if item i is at rank k, i=$\pi$(k). $S_n$ represents the set of permutations of size n. Given a relevance vector $\rho \in \mathbb{R}^n$, $\pi_{PRP}$ can may be an arbitrary ranking such that $$\rho_{\pi_{PRP(1)}} \geq \ldots \geq \rho_{\pi_{PRP(n)}}.$$

A ranking $\pi_{PRP}$ orders the items by decreasing relevance scores.

The exposure si given by the exposure module 1624 of an item i for a ranking $\pi \in S_n$ can be expressed as $$\varepsilon_i(\pi, \gamma, k, \rho) = \gamma^{\pi^{-1}(i)-1} \prod_{l=1}^{\pi^{-1}(i)-1} (1 - \kappa\rho_{\pi(l)})$$

where $\gamma \in (0, 1)$ is the probability of non-abandonment, and $\kappa \in (0, 1)$ is the probability of (a user) stopping the search at a relevant item $\pi^{-1}(i)$ is the rank of item i. The above equation may refer to a user proceeding through a ranked list of items and at rank l, the user has a probability of $1-\gamma$ of abandoning the search and a probability of $\kappa\rho_{\pi(l)}$ of being satisfied with the item $\pi(l)$ and as a result stop the search. The exposure vector may be written more simply (and without $\gamma$, k, $\rho$) as $\varepsilon(\pi) = (\varepsilon_1(\pi), \ldots, \varepsilon_n(\pi))^T$.

The DBN exposure model is general and encompasses other models such as the Cascade Model (CM), the Simplified Dynamic Bayesian Network (SDBN), a discrete choice model (DCM), and a click chain model (CCM). At the producer side, exposure can also be interpreted as the value documents get from a ranking.

Given a distribution over rankings $\mathcal{D}$, the exposure vector of $\mathcal{D}$ is the expectation $$\varepsilon(\mathcal{D}) := \mathbb{E}_{\pi \sim \mathcal{D}}[\varepsilon(\pi)].$$

Regarding user utility, the utility of a ranking may be defined as the scalar product of exposure with relevance, which may correspond to an expected reciprocal rank (ERR) metric. Formally, $$U(\pi) = \rho^T \varepsilon(\pi).$$

Given a distribution over rankings $\mathcal{D}$, the utility of $\mathcal{D}$ can be expressed as $$U(\mathcal{D}) = \mathbb{E}_{\pi \sim \mathcal{D}}[U(\pi)]$$

The utility may be a linear function of the exposure vector. This may be similar to the DCG metric with the difference being that a PBM exposure is used for the DCG metric. Normalized utility may be denoted nU and may be the utility divided by the utility obtained with a PRP ranking $$nU(\pi) = \frac{U(\pi)}{U(\pi_{PRP})}.$$

The normalized utility is useful to aggregate utilities across different queries meaningfully.

Assuming that a decision maker has decided upon a vector of merits $\mu \in \mathbb{R}^n$ with nonnegative components. The fact that the vector of merits is a free parameter makes the setting flexible in terms of covered fairness notions. The vector of metrics can be set equal to the relevance vector as to get a meritocratic fairness or can be set to 1 for demographic fairness. This setting may be provided by the administrator module 1632.

An exposure vector $\varepsilon$ may be said to be fair if it is proportional to the vector of merits $\mu$, i.e., if there exists a positive real number k$\in \mathbb{R}_+$ such that $\varepsilon$=k $\mu$. There exists at most one exposure vector that is proportional to $\mu$ such that it is achievable by a distribution over rankings, i.e., such that there exists a distribution over rankings $\mathcal{D}$ with $\varepsilon(\mathcal{D}) \propto \mu$. When such a feasible vector exists, it can be denoted $\varepsilon^*$ and may be referred to as a target exposure. When such a feasible vector does not exist, the exposure module 1624 may relax a proportionality relationship into an affine relationship by adding a constant value to each element of $\mu$ until the corresponding vector is feasible. In other words, the merit vector $\mu'=\mu+K1$ may be used for minimal K, and the target exposure can be defined as $\varepsilon^* \propto \mu'$. The target exposure may be expressed differently, however, such as by projecting I on the expohedron with a euclidean distance.

Unfairness of a distribution over the rankings may be measured by the exposure module 1624 by the Euclidean distance of the expected exposure to the target exposure can be expressed as $$F(\mathcal{D}) = \|\mathbb{E}_{\pi \sim \mathcal{D}}[\varepsilon(\pi)] - \varepsilon^*\|_2$$

Regarding normalized utility, normalized unfairness (nF) can be described as the unfairness divided by the unfairness obtained with a PRP ranking and as follows $$nF(\mathcal{D}) := \frac{\|\mathbb{E}_{\pi \sim \mathcal{D}}[\mathcal{E}(\pi)] - \mathcal{E}^*\|_2}{\|\mathcal{E}_{PRP} - \mathcal{E}^*\|_2}.$$

This normalization has an advantage of giving a metric with values between 0 and 1 (for Pareto-optimal distributions) independently of the number of items n, and the above equation for normalized unfairness assumes that the target exposure is different than the exposure obtained with a PRP ranking.

The normalized unfairness and the normalized utility are the two objectives of the multi-objective optimization (MOO) problem solved by the exposure module 1624 to determine the exposure vector. The MOO problem can be expressed by the two objectives $$\max_{\mathcal{D}} nU(\mathcal{D}), \min_{\mathcal{D}} nF(\mathcal{D}).$$

The exposure module 1624 determines a set of distributions $\mathcal{D}$ of rankings that is Pareto-optimal for the two objectives above. nF and nU depend on $\mathcal{D}$ only through the expected value $\varepsilon(\mathcal{D})$. It is therefore possible to decompose the MOO problem into the two sub-problems solved by the exposure module 1624:

(1) find all pareto-optimal vectors $\varepsilon \in \mathbb{R}^n$ that are expectation of a distribution $\mathcal{D}$; and (2) given a pareto-optimal exposure vector $\varepsilon \in \mathbb{R}^n$, find distribution $\mathcal{D}$ such that $\varepsilon = \mathbb{E}_{\pi \sim \mathcal{D}}[\varepsilon(\pi)]$.

The exposure module 1624 generates a DBN expohedron using the DBN model based on the relevances of the items to be ranked. The exposure module 1624 determines the distribution $\mathcal{D}$ from the DBN expohedron using a Carathéodory decomposition algorithm such that $\varepsilon(\mathcal{D}) = \varepsilon$ for any $\varepsilon$ where such a distribion exists and solving the MOO problem. The properties can recover the whole set of pareto-optimal exposure vectors for the MOO with a complexity of $O(n^3)$ where n is the number of items to be ranked.

The DBN expohedron is a convex hull of the exposure vectors achieved with a ranking generated using the DBN exposure model and not a PBM exposure model. Given a DBN exposure model parameterized by $\gamma \in [0,1), k \in ]$ and given exposure vector $\rho \in [0,1]^n$, the DBN expohedron generated by the exposure module 1624 can be described as $$\Pi(\gamma, k, \rho) \text{Conv}(\{\varepsilon(\pi, \gamma, k, \rho) | \pi \in S_n\})$$

The DBN expohedron may be a convex hull of all exposure vectors with $\varepsilon(\pi)$ with $\pi \in S_n$ and $S_n$ being the set of permutations of size n. The DBN expohedron therefore includes the exposure vectors that are expected values of distributions over rankings. Vectors inside of the expohedron. Vectors outside of the DBN expohedron may be infeasible. The DBN expohedron is contained in a hyperplane of $\mathbb{R}^n$ and is an object of dimension n−1.

Proposition 1

The polytope $\Pi(\gamma, k, \rho)$ is contained in a hyperplane with normal vector $$v = 1 + \frac{\gamma \kappa}{1-\gamma} \rho.$$

For every vector of merits µ there exists at most one feasible expected exposure $\varepsilon^*$ vector such that $\varepsilon^* \propto \mu$ because the arrow in the direction i intersects the hyperplane at most once.

Figure 18:
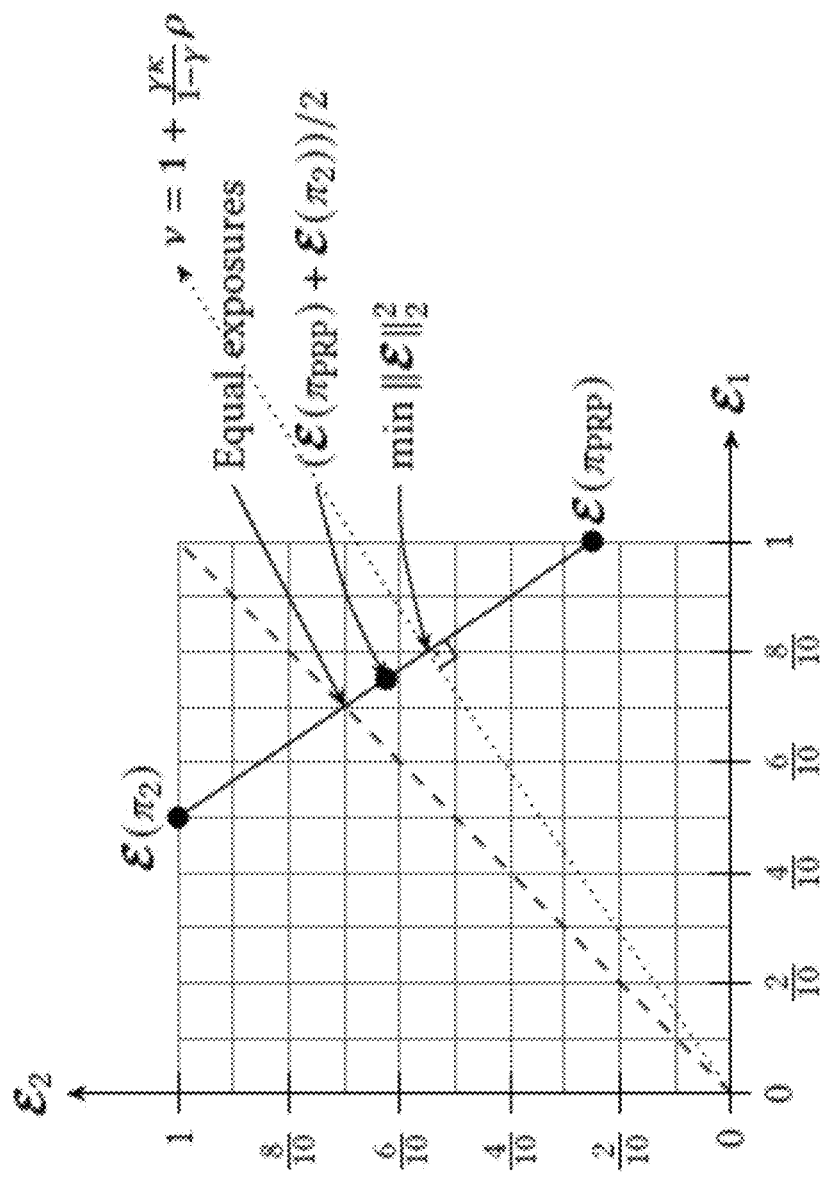
FIG. 18 is a graph including an example DBN expohedron for n=2 items with some relevances and parameters.

The fact that the normal vector is not 1 as would be in the case for a PBM generated expohedron implies that minimizing $\|\varepsilon\|$ may not lead to equal exposures as illustrated in FIG. 18. FIG. 18 is a graph including an example DBN expohedron for n=2 items with relevances $\rho=(1,0)$ and parameters $\gamma=\kappa=0.5$. FIG. 18 illustrates that minimizing $\|\varepsilon\|_2^2$ may not lead to equity in the rankings of the items.

Recall that zone $Z(\pi)$ is the subset of $\mathbb{R}^n$ of the vectors x such that $x_{\pi(1)} \geq \ldots x_{\pi(n)}$. The faces of the DBN expohedron can be characterized as follows. The normal vectors to the faces of the DBN expohedron, however, take a different expression relative to using a PBM model.

Proposition 2

Each face F of $\Pi(\gamma, k, \rho)$ (the DBN expohedron) is characterized by $Z(\pi)$ with $\in S_n$ and a subset of S of $\{1, \ldots, n\}$ called a set of splits. A face ay be denoted by $F=(\pi, S)$. In the basis in which $\pi$ is the identity |S|, normal vectors of a face are expressed by $$v_s = 1(s) + \frac{\gamma \kappa}{1-\gamma}(\rho \odot 1(s)), \forall \in S \text{ where}$$

$$1(s)_i = \left\{ \begin{array}{l} 1 \text{ if } i \leq s \\ 0 \text{ otherwise} \end{array} \right\}.$$

The above is different than a PBM generated expohedron because of the shape and non-symmetry of a DBN expohedron.

Using the above, the exposure module 1624 checks whether a point $x \in \mathbb{R}^n$ is inside of the DBN expohedron $\Pi(\gamma, k, \rho)$ using the algorithm shown in FIG. 19. The algorithm of FIG. 19 is different than that which could be used for a PBM generated expohedron because of the shape and non-symmetry of a DBN expohedron. The exposure module 1624 performs the algorithm of FIG. 19.

Line 3 involves picking a vertex having the same ordering as point x. Line 4 initializes the is_inside variable which indicates whether the point x is inside of the DBN expohedron. Line 5 involves determining whether point x is in the same hyperplane as the DBN expohedron. If not, the is_inside variable is set to false on line 6 indicating that x is not within the DBN expohedron (a polytope) and the algorithm ends. The loop of lines 8-10 involves iterating through each facet adjacent to the vertex v and determining whether the point x is within the facet or not (line 9). The variable is inside is true i and only if $x \in \Pi(\gamma, k, \rho)$. The complexity of this algorithm is $O(n^2)$.

The exposure module 1624 determines the smallest (dimension) face (vertex, edge, face, or polytope) in which a point x is contained using the algorithm of FIG. 20. Line 3 involves picking a vertex with the same ordering as the point x. A variable is initialized to an empty set on line 4. Lines 5-8 involve iterating through each face that is adjacent to the vertex (line 5) and checking whether x lies on a facet. If the point x lies on only 2 facets, the point x lies on an edge (for the example of ranking 3 items). If the point lies on only 3 facets, the point x lies on a vertex (for the example of ranking 3 items). If the point x lies on only 1 facet, the point x may generally lie on the DBN expohedron. The exposure module 1624 determines the smallest face based on (a) the number of items to be ranked and (b) the number of facets upon which X lies.

With the algorithm of FIG. 20, the exposure module projects vectors on the lowest dimensional subspace of the DBN expohedron including a face $F=(\pi, S)$ since the normal vectors are known. The exposure module 1624 may do this by building an orthonormal projection matrix from the set (e.g., of normal vectors) $\{v_s | s \in S\}$ using, for example, the Gram-Schmidt orthonormalization process.

To express a feasible target exposure as the expected exposure of a distribution over rankings, the exposure module 1624 expresses any point inside the DBN expohedron as a convex combination of its vertices. A combination that uses at most n vertices is called a Carathéodory decomposition performed by the exposure module 1624.

The exposure module 1624 performs a Carathéodory decomposition that is specific to the DBN expohedron and is different than a Carathéodory decomposition performed based on an PBM generated expohedron. The Carathéodory decomposition involves (1) finding the intersection of a half-line starting from inside of the polytope (the DBN expohedron) with the border of the polytope and (2) given a point on a face of the polytope, finding a vertex of the same face. (1) can be solved using a bisection search and checking whether a point is inside of the polytope or not (e.g., the algorithm of FIG. 19). (2) involves, given a point $v \in Z(\pi)$ on a face F of the DBN expohedron, the vertex $\varepsilon(\pi)$ is also on the face F because there is only 1 vertex in each zone.

Figure 21:
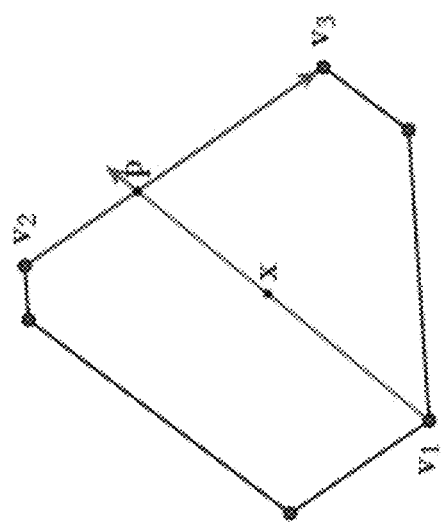
FIG. 21 is an example DBN expohedron for n=3 items to rank based on a relevance vector and various parameters.

FIG. 21 is an example DBN expohedron for n=3 items to rank with relevance vector $\rho=(0.1, 0.5, 0.9)$, $\gamma=0.5$, k=0.7. The arrows illustrate the procedure for the Carathéodory decomposition of point x (ending when line starting at v2 extending through point p reaches vertex v3). The point x is decomposed as a convex sum of vertices v1, v2, and v3.

FIG. 22 includes an example algorithm for the Carathéodory decomposition. The algorithm of FIG. 22 is performed by the exposure module 1624. Line 2 involves selecting an initial vertex of the DBN expohedron, and line 3 involves setting the weight of that vertex to 1. The loop of lines 5-10 includes iteratively selecting a vertex of the polytope (DBN expohedron) at line 5. At line 6, a line is drawn from the selected vertex (V1 initially) through point x to point p where the line intersects the border of the polytope. The convex coefficients are updated at line 7. For a next instance of the loop, the vertex v2 is selected from faces of p using the algorithm of FIG. 20. The algorithm of FIG. 22 outputs the vertices used iteratively and the coefficients $\alpha$.

The MOO problem can be expressed for DBN expohedrons as $$\max_{\mathcal{E} \in \pi} \rho^T \mathcal{E}, \min_{\mathcal{E} \in \pi} \|\mathcal{E} - \mathcal{E}^*\|_2.$$

One objective is linear, while the other objective is quadratic. The exposure module 1624 starts from an extremity the point $\varepsilon^*$, the only one for which the unfairness is minimal. The level curves of unfairness are hyperspheres centered in $\varepsilon^*$, so the objective deteriorates similarly in every direction. Because of this, the direction moved from this point is the one where utility is increased (e.g., maximally) with the constraint of staying inside of the DBN expohedron. The direction moved is the projection of the relevance vector $\rho$ onto the hyperplane including the DBN expohedron. The exposure module 1624 follows this direction until the border of the expohedron is reached on a face of the expohedron. The same may be repeated on the present face of the expohedron and followed in the direction of the projection of $\rho$ onto the hyperplane including the current face. Each face has at least one dimension less than the previous face, so the end point will be the PRP vertex or at a point on a face with maximal utility.

FIG. 23 includes an algorithm to determine the pareto-optimal set to solve the MOO problem for the DBN expohedron. The algorithm of FIG. 23 is performed by the exposure module 1624. Line 2 involves determining the face where the point lies. Lines 3-5 includes determining the direction to move on the face to increase utility. Line 6 begins a loop to find a predetermined or maximal utility value. Line 7 involves moving in the direction of $\rho$ until a border of the face is reached. Line 8 involves v being a point on the border of the face of smaller dimension than the previous face. The output is at most n points. The pareto-optimal curve is the union of the line segments of endpoints, such as illustrated by 2404 in the example graph of FIG. 24. The algorithm of FIG. 23 finds all pareto optimal exposure vectors in the expohedron $\Pi(\gamma, k, \rho)$.

Figure 24:
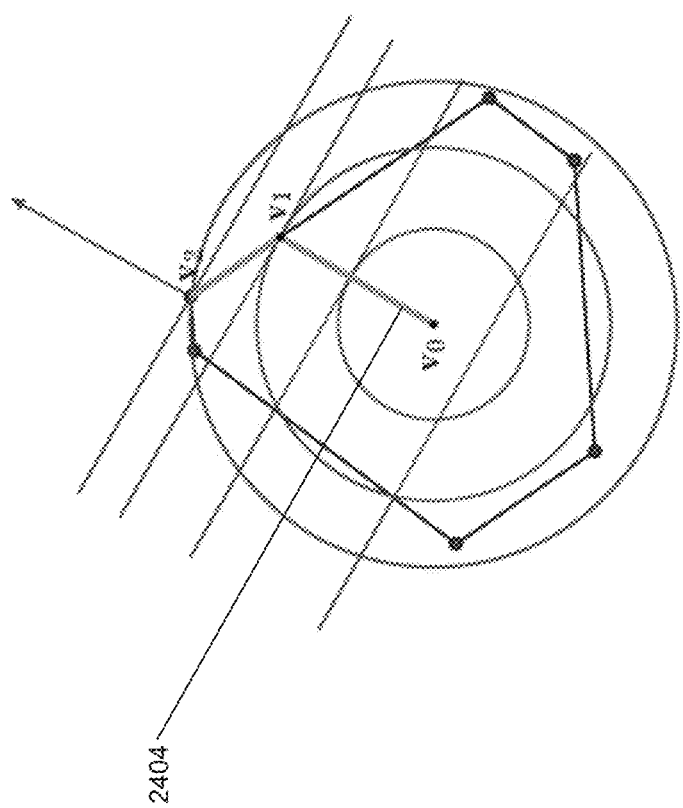
FIG. 24 includes an example animation of the operation of the algorithm of FIG. 23 on a DBN expohedron.

FIG. 24 includes an example animation of the operation of the algorithm of FIG. 23 on a DBN expohedron with $\rho=(0.1, 0.5, 0.9)$, $\gamma=0.5$, k=0.7. The circles are the level curves of the fairness objective, while the diagonal lines are the level curves of the utility objective. The arrow is the direction of the steepest ascent for the utility objective: the vector $\rho$ projected on the expohedron's hyperplane including the current face. Each face has at least one less dimension than the previous face, so the final point is a PRP vertex or a point on a face with maximal utility.

The exposure module 1624 determines the line, such as 2404 in FIG. 24. The exposure module 1624 determines a point on the line. All points on this line are optimal for different values of fairness and utility. Fairness and utility settings may be provided by the administrator module 1632. The algorithm of FIG. 22 can be used to express the distribution of permutations for the selected point by the exposure module 1624. The exposure module samples from the distribution to determine the rankings for the items. The sampling may be performed using balanced words, randomly, or in another suitable manner.

Generally speaking, the exposure module 1624 builds the pareto optimal curve in the DBN expohedron. The exposure module 1624 then chooses a point on the curve corresponding to a tradeoff a between nU and nF. The exposure module 1624 expresses the expected value of a distribution over permutations. The ranking module 1612 then determines the sequence of rankings for the items, such as using the m-balanced words selection. The m-balanced words are sequences of letters such that in every sub-string the frequencies of each letter are as equal as possible given an overall proportion in the whole string. Using balanced words instead of randomly sampling from the distribution D to more accurately approach the expected value of the distribution D at any time.

Figure 25:
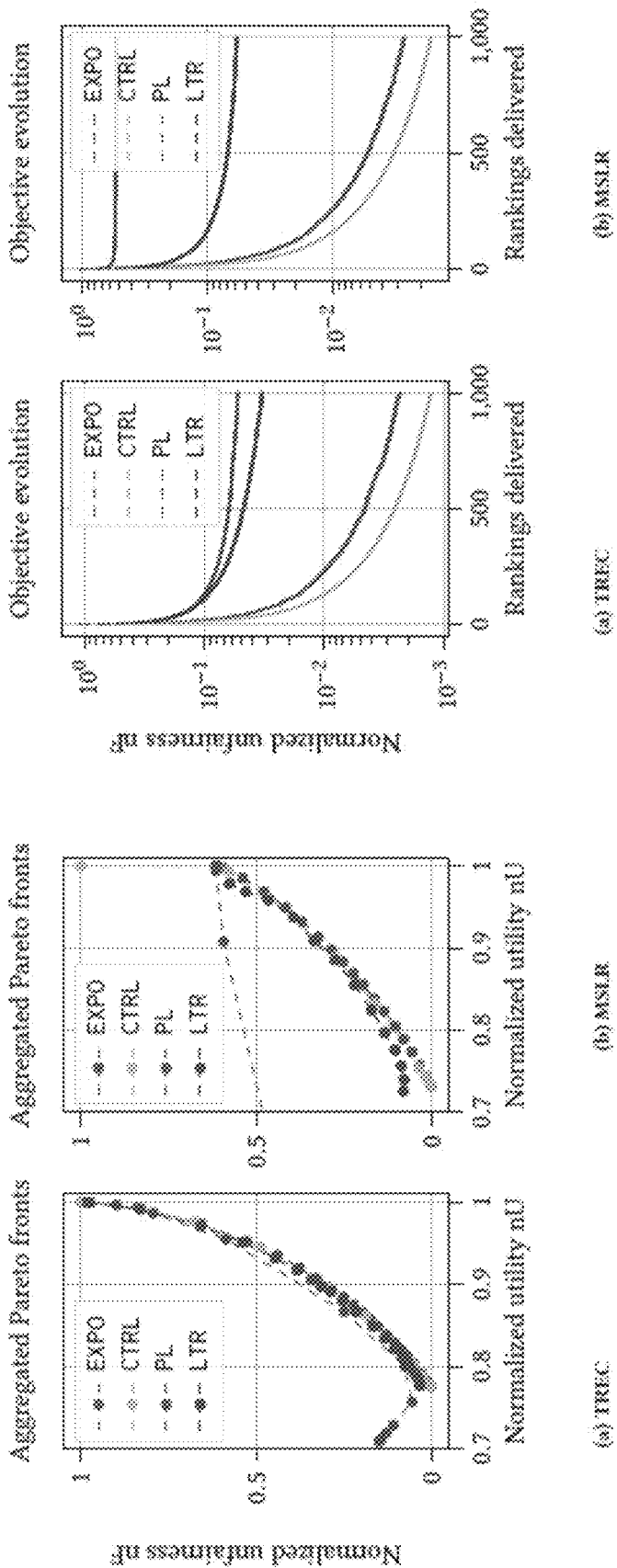
FIG. 25 includes example experimental results for an embodiment of the present application (labeled EXPO) versus other methods (CTRL, PL, LTR) for different datasets.

FIG. 25 includes example experimental results for an embodiment of the present application (labeled EXPO) versus other methods (CTRL, PL, LTR) for different datasets (TREC and MSLR). FIG. 25 illustrates that this embodiment of the present application produces pareto optimal expected exposure vectors.

Described herein is a DBN exposure model that generates a DBN expohedron for exposure of items. Carathéodory decomposition of any point inside a DBN expohedron can be found. This makes it possible to express any feasible target exposure as the expected exposure of a distribution over rankings. The algorithm has a complexity of $O(n^3)$ where n is the number of items to rank.

Further detail and proofs can be found in the accompanying appendix.

Figure 26:
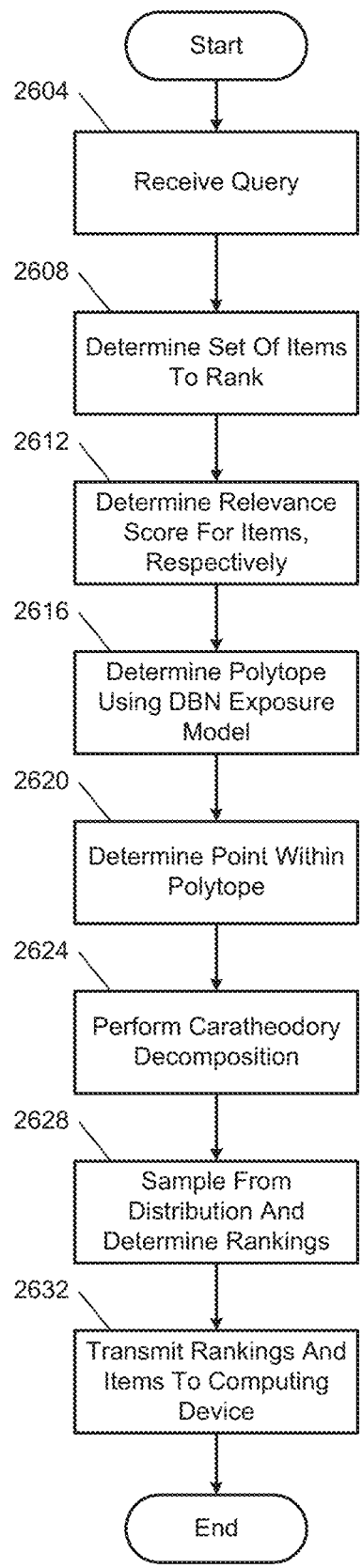
FIG. 26 is a flowchart depicting an example method of ranking items.

FIG. 26 is a flowchart depicting an example method of ranking items. Control begins with 2604 where the search module 1400 receives a query from a computing device. At 2608, the response module 1604 determines the items to rank based on the query. At 2612, the relevance module 1620 determines the relevance scores (the relevance vector) for the relevances of the items, respectively.

At 2616, the exposure module 1624 generates a polytope (a DBN expohedron) using the DBN model based on the relevance scores, as discussed above. At 2620, the exposure module 1624 (or the ranking module 1612) determines a point within (inside of) the polytope. At 2624, the exposure module 1624 (or the ranking module 1612) performs a Carathéodory decomposition on the point inside the polytope to determine a distribution. At 2628, the ranking module 1612 samples from the distribution and determines the rankings for the items, respectively. At 2632, the response module 1604 transmits the rankings for the items to the computing device via the network. Advantageously, the example method of ranking items, which finds the set of Pareto-optimal solutions, makes it possible to express any feasible target exposure as the expected exposure of a distribution over rankings.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method for ranking a set of objects, the method comprising:
  receiving a query from a computing device via a network;
  identifying the objects in the set based on the query;
  receiving the set of objects to rank, a relevance score for each object in the set, and a set of objective functions, the set of objective functions including a fairness function and a utility function;
  based on the relevance scores for the objects, defining a decision space having n decision variables using a polytope, where n is the number of objects to rank and where vertices of the polytope represent permutations of exposures provided to the objects in the set by corresponding rankings;
  determining a Pareto-set for the set of objective functions;
  based on a Pareto-optimal point in the Pareto-set, determining a distribution over rankings for the objects in the set using the decision space, where a proportion is associated with each ranking in the distribution;
  selecting a sequence of rankings for the objects in the set based on the distribution in accordance with their proportions; and
  transmitting, in response to the query, the selected sequence of rankings of the objects to the computing device via the network for display of at least a subset of the set of objects on a display according to the selected sequence of rankings.

2. The computer-implemented method according to claim 1, wherein the set of objective functions comprises a quadratic function and a linear function.

3. The computer-implemented method according to claim 2, wherein the quadratic function comprises the fairness function, and the linear function comprises the utility function.

4. The computer-implemented method according to claim 3, wherein the fairness function is a normalized function of the difference between a vector made up of decision variables and a target vector.

5. The computer-implemented method according to claim 3, wherein the fairness function is a normalized function.

6. The computer-implemented method according to claim 5, wherein the normalized function is a squared L2-norm function.

7. The computer-implemented method according to claim 1, wherein the method further comprises:
  receiving a list of exposures provided to the objects in the set, a ranking fairness objective function, and a ranking utility objective function,
  wherein defining the decision space includes determining the decision space based on the relevance scores and the list of exposures, and
  wherein determining the Pareto-set includes determining the Pareto-set within the decision space based on the ranking fairness objective function and the ranking utility objective function.

8. The computer-implemented method according to claim 7, wherein determining the distribution includes:
  receiving a point in the Pareto-set which translates to a target exposure across the objects in the set within the decision space; and
  using the target exposure, determining the distribution which achieve on average the target exposure for the objects in the set, each ranking corresponding to a vertex in the decision space.

9. The computer-implemented method according to claim 8, wherein the determining the distribution includes, for the number of objects in the set:
  (i) determining a vertex of the decision space;
  (ii) drawing a line starting at the vertex through the target exposure until the line intersects a face of the polytope; and
  (iii) repeating (i) and (ii) on the intersected face of the polytope using the new intersection point instead of the target exposure, until the newly intersected face is a second vertex,
  wherein each vertex of the decision space has an associated proportion in the distribution.

10. The computer-implemented method according to claim 1, wherein the fairness function comprises at least one of a meritocratic fairness function and a demographic fairness function.

11. The computer-implemented method according to claim 1, wherein the polytope is determined based on the relevance score using an exposure model with exposures that depend on a document's rank.

12. The computer-implemented method according to claim 1, wherein the polytope is determined based on the relevance score using an exposure model with exposures that depend on a document's rank and a document's relevance.

13. The computer-implemented method according to claim 12, wherein the polytope is determined based on the relevance score using an exposure model with exposures that depend on a document's rank and a document's relevance and ranks of other documents and relevances of the other documents.

14. The computer-implemented method according to claim 1, wherein said determining the distribution includes determining the distribution using a Grotschel, Lovasz and Schrijver (GLS) procedure.

15. The computer-implemented method according to claim 1, wherein the selecting a sequence of rankings includes selecting the sequence of rankings using one or more of stochastic sampling, Low-Discrepancy Sequences, additive-recurrence sequences, Stride Scheduling, or m-balancing.

16. The computer-implemented method according to claim 1, wherein the objects in the set include documents.

17. The computer-implemented method according to claim 1, wherein the objects in the set include recommendations.

18. The computer-implemented method according to claim 17 further comprising identifying the objects in the set in response to a location.

19. A computer-implemented method, comprising:
receiving a query from a computing device via a network;
determining a set of items to be ranked based on the query;
determining relevance scores for the items, respectively, using a fairness function and a utility function;
determining a polytope using an exposure model based on the relevance scores;
determining a point that lies within the polytope;
performing a Carathéodory decomposition;
generating a distribution for the items based on a result of the Carathéodory decomposition;
sampling from the distribution;
determining rankings for the items based on the sampling; and
in response to the query, transmitting the rankings of the items to the computing device via the network for displaying at least a subset of the set of objects on a display according to the rankings.

20. The computer-implemented method of claim 19 wherein the exposure model is one of a Position-Based Model (PBM) and a Dynamic Bayesian Network (DBN) model.

21. The computer-implemented method of claim 19 wherein the Carathéodory decomposition includes selecting a vertex of the polytope, finding an intersection of a line with a border of the polytope using a bisection search.

22. The computer-implemented method of claim 21 wherein the result of the Carathéodory decomposition includes vertices of the polytope and coefficients for the vertices, respectively.

23. The computer-implemented method of claim 19 wherein the determining the point includes determining a smallest dimension face upon which the point lies.

24. The computer-implemented method of claim 23 wherein the face is one of a vertex, an edge, a face, and the polytope.

25. The computer-implemented method of claim 24 wherein the determining the smallest dimension face includes determining a number of adjacent faces upon which the point lies.

26. The computer-implemented method of claim 19 wherein the sampling includes one of sampling from the distribution using one of random sampling and m-balanced words sampling.

27. The computer-implemented method of claim 19 wherein the determining the rankings includes:
determining a face of the polytope upon which the point lies;
determining a projection on a plane of the face;
projecting the projection on the plane; and
finding the point on the projection where a utility of the rankings is a maximum utility.

28. The computer-implemented method of claim 27 wherein the determining the ranks further includes:
determining a second face of the polytope upon which the point lies;
determining a second projection on a second plane of the second face;
projecting the second projection on the second plane; and
finding the point on the second projection where the utility of the rankings is the maximum utility.

29. The computer-implemented method of claim 27 wherein the polytope is asymmetrical.

30. The computer-implemented method of claim 19 wherein the determining the polytope includes determining the polytope further based on a continuation probability value and a satisfaction probability value.

31. The computer-implemented method of claim 30 wherein the continuation probability value corresponds to a probability of a user stopping reviewing the items.

32. The computer-implemented method of claim 31 wherein the satisfaction probability value corresponds to a probability of a user being satisfied with one of the items.

33. A system comprising:
a computing device;
one or more processors; and
memory including code that, when executed by the one or more processors, perform to:
receive a query from the computing device via a network;
determine a set of items to be ranked based on the query;
determine relevance scores for the items, respectively, using a fairness function and a utility function;
determine a polytope using an exposure model based on the relevance scores;
determine a point that lies within the polytope;
perform a Carathéodory decomposition;
generate a distribution for the items based on a result of the Carathéodory decomposition;
sample from the distribution;
determine rankings for the items based on the sampling; and
transmit the rankings of the items to the computing device via the network,
wherein the computing device is configured to display at least a subset of the set of objects on a display according to the rankings.

* * * * *